US012087226B1

(12) United States Patent
Zhang et al.

(10) Patent No.: US 12,087,226 B1
(45) Date of Patent: Sep. 10, 2024

(54) DISPLAY PANEL AND DRIVING METHOD THEREOF, AND DISPLAY DEVICE

(71) Applicants: Wuhan Tianma Micro-Electronics Co., Ltd., Wuhan (CN); Wuhan Tianma Microelectronics Co., Ltd. Shanghai Branch, Shanghai (CN)

(72) Inventors: Mengmeng Zhang, Wuhan (CN); Gaojun Huang, Wuhan (CN); Yana Gao, Wuhan (CN); Xueqi Tian, Wuhan (CN); Xingyao Zhou, Wuhan (CN)

(73) Assignees: Wuhan Tianma Micro-Electronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/127,482

(22) Filed: Mar. 28, 2023

(30) Foreign Application Priority Data

Nov. 21, 2022 (CN) ........................ 202211456256.4

(51) Int. Cl.
*G09G 3/3233* (2016.01)

(52) U.S. Cl.
CPC ..... *G09G 3/3233* (2013.01); *G09G 2300/043* (2013.01); *G09G 2310/061* (2013.01); *G09G 2320/0247* (2013.01); *G09G 2330/021* (2013.01)

(58) Field of Classification Search
CPC ........... G09G 3/3233; G09G 2300/043; G09G 2310/061; G09G 2320/0247; G09G 2330/021
See application file for complete search history.

(56) References Cited

U.S. PATENT DOCUMENTS

2015/0170577 A1* 6/2015 Bae ...................... G09G 3/3291 345/212
2021/0264857 A1* 8/2021 Wang ................... G09G 3/3258
2021/0366397 A1* 11/2021 Na ....................... G09G 3/3258
2023/0145644 A1* 5/2023 Shin ..................... G09G 3/3233 345/212

FOREIGN PATENT DOCUMENTS

CN 104732917 B 6/2015
CN 112634832 A 4/2021
CN 113889035 A 1/2022

* cited by examiner

*Primary Examiner* — Matthew A Eason
*Assistant Examiner* — Sujit Shah
(74) *Attorney, Agent, or Firm* — Anova Law Group, PLLC

(57) ABSTRACT

Display panel and driving method thereof, and display device are provided. The display panel includes sub-pixels. Each sub-pixel includes a pixel circuit and a light-emitting element. The pixel circuit includes a driving transistor, a data input module, a threshold compensation module, and a bias adjustment module. First electrode of the driving transistor is connected to the data input module and the bias adjusting module. First terminal of the data input module is connected to a data signal, a second terminal of the data input module is connected to the first electrode of the driving transistor. First terminal of the bias adjustment module is connected to a bias adjustment signal, a second terminal of the bias adjustment module is connected to the first electrode of the driving transistor. The threshold compensation module is connected between a gate of the driving transistor and a second electrode of the driving transistor.

20 Claims, 12 Drawing Sheets

00

DISPLAY PANEL AND DRIVING METHOD THEREOF, AND DISPLAY DEVICE

CROSS-REFERENCE TO RELATED APPLICATION

This application claims priority of Chinese Patent Application No. 202211456256.4, filed on Nov. 21, 2022, the entire content of which is hereby incorporated by reference.

FIELD OF THE DISCLOSURE

The present disclosure generally relates to the field of display technology and, more particularly, relates to a display panel and a driving method thereof, and a display device.

BACKGROUND

An organic light-emitting diode (OLED) may have characteristics of self-light-emitting, fast response, wide color gamut, large viewing angle, and high brightness. OLEDs may be used in manufacturing thin display devices and flexible display devices, and have become a focus of current research in the field of display technology. An OLED needs to be driven by electric current. When applied in the display field, a driving transistor in a pixel circuit may be controlled to provide driving current to an OLED to make the OLED to emit light. Moreover, stable driving current may be required to be provided to the OLED such that ideal display performance may be achieved in application.

In existing technologies, a driving transistor of a pixel circuit may have a problem of threshold voltage drift after long-term operation, and display quality may thus be affected. In addition, existing display panels may have high power consumption during display, and application of display panels may thus be limited.

As such, it is an urgent technical problem for those skilled in the art to provide a display panel, a driving method thereof, and a display device that may alleviate the problem of poor display quality caused by the threshold voltage drift of the driving transistor after long-term operation and reduce the power consumption of the display panel.

SUMMARY

One aspect of the present disclosure includes a display panel. The display panel includes a plurality of sub-pixels. Each of the plurality of sub-pixels includes a pixel circuit, and a light-emitting element electrically connected to the pixel circuit. The pixel circuit includes a driving transistor, a data input module, a threshold compensation module, and a bias adjustment module. A first electrode of the driving transistor is electrically connected to the data input module and the bias adjusting module respectively, and the driving transistor is configured to generate driving current. A first terminal of the data input module is electrically connected to a data signal, a second terminal of the data input module is electrically connected to the first electrode of the driving transistor, and the data input module is configured to provide the data signal to the driving transistor. A first terminal of the bias adjustment module is electrically connected to a bias adjustment signal, a second terminal of the bias adjustment module is electrically connected to the first electrode of the driving transistor, and the bias adjustment module is configured to provide the bias adjustment signal to the first electrode of the driving transistor to adjust a bias state of the driving transistor. The threshold compensation module is connected between a gate of the driving transistor and a second electrode of the driving transistor, and the threshold compensation module is configured to detect and compensate deviation of a threshold voltage of the driving transistor. The first electrode of the driving transistor is connected to a first power supply signal, and the second electrode of the driving transistor is connected to a second power supply signal. The first power signal is a fixed value, the second power signal is a variable value, and the bias adjustment signal is a variable value.

Another aspect of the present disclosure includes a display device. The display device includes a display panel. The display panel includes a plurality of sub-pixels. Each of the plurality of sub-pixels includes a pixel circuit, and a light-emitting element electrically connected to the pixel circuit. The pixel circuit includes a driving transistor, a data input module, a threshold compensation module, and a bias adjustment module. A first electrode of the driving transistor is electrically connected to the data input module and the bias adjusting module respectively, and the driving transistor is configured to generate driving current. A first terminal of the data input module is electrically connected to a data signal, a second terminal of the data input module is electrically connected to the first electrode of the driving transistor, and the data input module is configured to provide the data signal to the driving transistor. A first terminal of the bias adjustment module is electrically connected to a bias adjustment signal, a second terminal of the bias adjustment module is electrically connected to the first electrode of the driving transistor, and the bias adjustment module is configured to provide the bias adjustment signal to the first electrode of the driving transistor to adjust a bias state of the driving transistor. The threshold compensation module is connected between a gate of the driving transistor and a second electrode of the driving transistor, and the threshold compensation module is configured to detect and compensate deviation of a threshold voltage of the driving transistor. The first electrode of the driving transistor is connected to a first power supply signal, and the second electrode of the driving transistor is connected to a second power supply signal. The first power signal is a fixed value, the second power signal is a variable value, and the bias adjustment signal is a variable value.

Other aspects of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
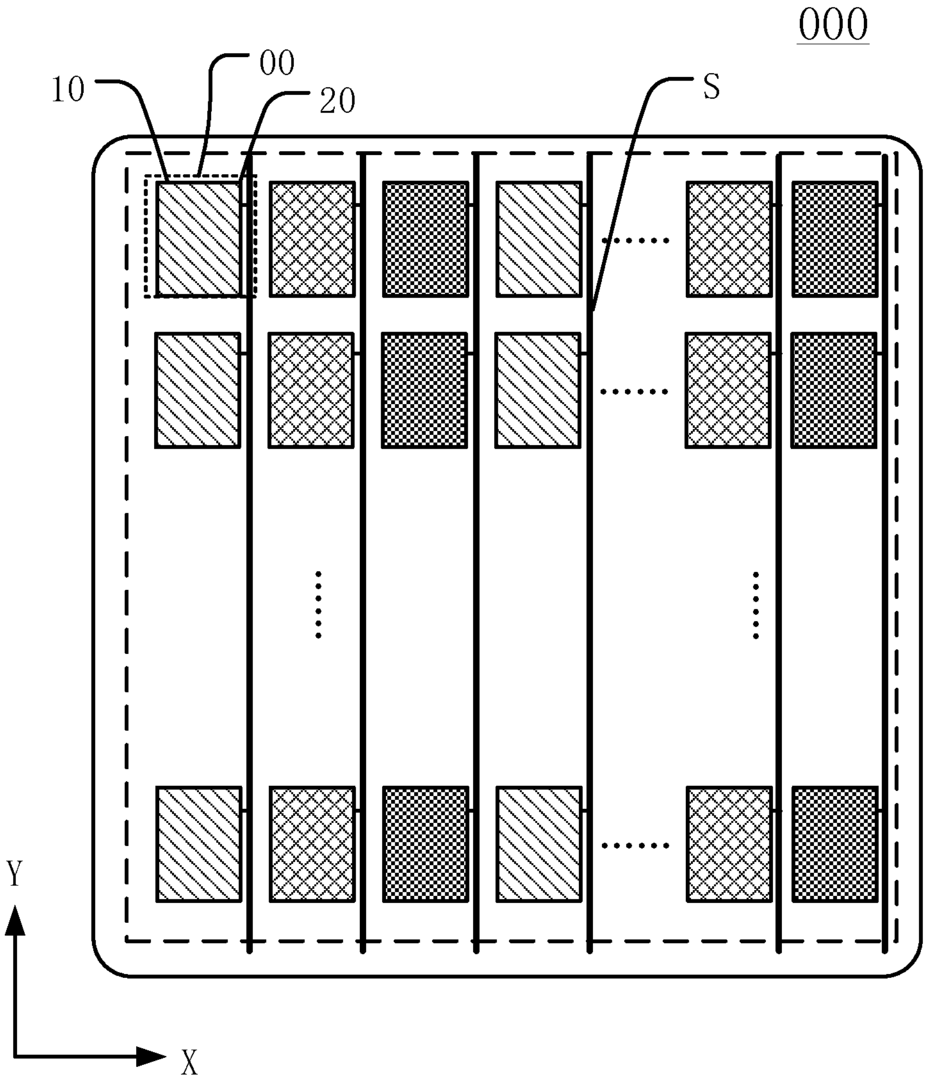
FIG. 1 illustrates a schematic planar structural diagram of a display panel consistent with the disclosed embodiments of the present disclosure.

To make the objectives, technical solutions and advantages of the present disclosure clearer and more explicit, the present disclosure is described in further detail with accompanying drawings and embodiments. It should be understood that the specific exemplary embodiments described herein are only for explaining the present disclosure and are not intended to limit the present disclosure.

Technologies, methods, and equipment known to those of ordinary skill in relevant fields may not be discussed in detail, but where appropriate, these technologies, methods, and equipment should be regarded as part of the specification.

In the present disclosure, any specific values should be construed as examples only, and not as limitations. Different embodiments may have different values.

Reference will now be made in detail to embodiments of the present disclosure, which are illustrated in the accompanying drawings. Similar labels and letters designate similar items in the drawings. Once an item is defined in one drawing, the item may not be defined and discussed in subsequent drawings.

Figure 2:
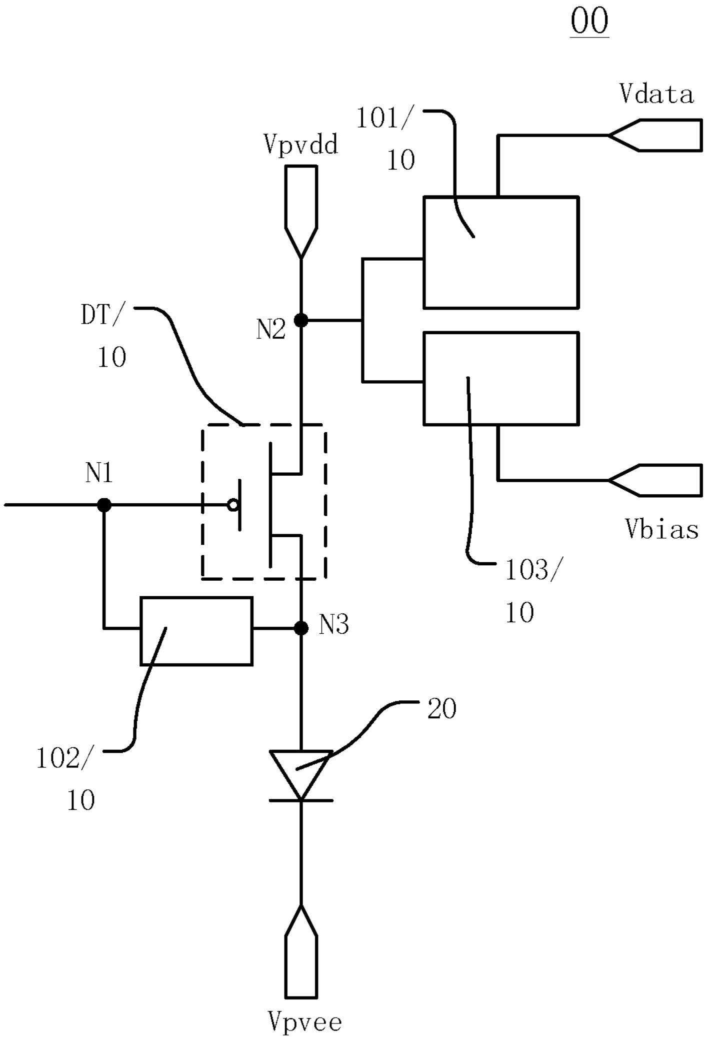
FIG. 2 illustrates a schematic structural diagram of circuit connection of a sub-pixel in FIG. 1, consistent with the disclosed embodiments of the present disclosure.

The present disclosure provides a display panel. FIG. 1 illustrates a schematic planar structural diagram of a display panel consistent with the disclosed embodiments of the present disclosure. FIG. 2 illustrates a schematic structural diagram of circuit connection of a sub-pixel in FIG. 1. With reference to FIGS. 1 and 2, the display panel 000 may include a plurality of sub-pixels 00. Each sub-pixel 00 may include a pixel circuit 10, and a light-emitting element 20 electrically connected to the pixel circuit 10.

The pixel circuit 10 may include a driving transistor DT, a data input module 101, a threshold compensation module 102, and a bias adjustment module 103.

The first electrode of the driving transistor DT may be electrically connected to the data input module 101 and the bias adjusting module 103 respectively. The driving transistor DT may be used to generate driving current.

The first terminal of the data input module 101 may be electrically connected to a data signal Vdata. The second terminal of the data input module 101 may be electrically connected to the first electrode of the driving transistor DT. The data input module 101 may be used to provide the data signal Vdata to the driving transistor DT.

The first terminal of the bias adjustment module 103 may be electrically connected to a bias adjustment signal Vbias. The second terminal of the bias adjustment module 103 may be electrically connected to the first electrode of the driving transistor DT. The bias adjustment module 103 may be used to provide the bias adjustment signal Vbias to the first electrode of the driving transistor DT, and adjust the bias state of the driving transistor DT.

The threshold compensation module 102 may be connected between the gate of the driving transistor DT and the second electrode of the driving transistor DT. The threshold compensation module 102 may be used to detect and compensate the deviation of the threshold voltage of the driving transistor DT.

The first electrode of the driving transistor DT may be connected to a first power supply signal Vpvdd. The second electrode of the driving transistor DT may be connected to a second power supply signal Vpvee. The first power signal Vpvdd may be a fixed value. The second power signal Vpvee may be a variable value. The bias adjustment signal Vbias may be a variable value.

Specifically, in one embodiment, the display panel 000 may be an organic light-emitting display panel, or another display panel in which the driving transistor DT in the pixel circuit 10 is controlled to provide driving current, making the light-emitting element 20 to emit light. In one embodiment, the light-emitting element 20 may be an organic light-emitting diode (OLED). In some other embodiments, the light-emitting element 20 may be a micro light-emitting diode or a submillimeter light-emitting diode. The present disclosure does not limit types of the light-emitting element 20.

In the present disclosure, an OLED display panel is used as an example for illustration of the display panel 000. In one embodiment, the display panel 000 includes a plurality of sub-pixels 00. The plurality of sub-pixels 00 may be arranged in an array. That is, the sub-pixels 00 may be arranged along the first direction X to form a sub-pixel row, and a plurality of the sub-pixel rows may be arranged along a second direction Y. The sub-pixels 00 may also be arranged along the second direction Y to form a sub-pixel column, and a plurality of the sub-pixel columns may be arranged along the first direction X, forming an array structure of the sub-pixels. The first direction X and the second direction Y may be intersecting or perpendicular to each other in a plane parallel to a plane where the display panel 000 is located. In some other embodiments, the plurality of sub-pixels 00 may be arranged in other ways. The present disclosure does not limit the arrangement of the plurality of sub-pixels 00. FIG. 1 only illustrates an example of the array arrangement of the plurality of sub-pixels 00.

The sub-pixel 00 may include a pixel circuit 10 and a light-emitting element 20 electrically connected to the pixel circuit 10. The pixel circuit 10 may be used to control the light-emitting element 20 to emit light. The light-emitting element 20 in the OLED display panel may be an OLED. The OLED is a current-driven element, and a corresponding pixel circuit 10 may be needed to provide driving current for the light-emitting element 20 such that the light-emitting element 20 may emit light. In one embodiment, the pixel circuit 10 includes a driving transistor DT and a data input module 101, a threshold compensation module 102 and a bias adjustment module 103. The first electrode of the driving transistor DT is electrically connected to the data input module 101 and the bias adjusting module 103 respectively. The driving transistor DT may be used to generate the driving current. The first electrode of the driving transistor DT may be understood as a source of the driving transistor DT, and then the second electrode of the driving transistor DT may be understood as a drain of the driving transistor DT. Alternatively, the first electrode of the driving transistor DT may be understood as the drain of the driving transistor DT, and the second electrode of the driving transistor DT may be understood as the source of the driving transistor DT.

The first terminal of the data input module 101 may be electrically connected to a data signal Vdata. Optionally, the first terminal of the data input module 101 may be connected to a data line S in the display panel 000, and the data signal Vdata may be transmitted to the first terminal of the data input module 101 through the data line S. The second terminal of the data input module 101 may be electrically connected to the first electrode of the driving transistor DT, and the data input module 101 may be used for providing the data signal Vdata to the driving transistor DT. The threshold compensation module 102 may be connected between the gate of the driving transistor DT and the second electrode of the driving transistor DT. The threshold compensation module 102 may be used to detect and compensate the deviation of the threshold voltage of the driving transistor DT. The threshold compensation module 102 may provide compensated deviation of the threshold voltage and the data signal provided by the data line to the driving transistor DT. The threshold compensation of the driving transistor DT may thus be realized. In one embodiment, through the threshold compensation module 102, the problem of display unevenness, caused by differences in the threshold voltages of the driving transistors DT due to the manufacturing process, and threshold voltage drift of the driving transistor DT caused by aging of the transistor, may be alleviated.

In existing technologies, in a driving cycle when the pixel circuit drives the light-emitting element to display, when the pixel circuit is working in a light-emitting stage, the gate potential of the driving transistor may be higher than the potential of the second electrode (such as the drain electrode). Accordingly, the driving transistor may be forward biased, resulting in hysteresis in the driving transistor. Long-term of hysteresis in the driving transistor may lead to ion polarization inside the driving transistor, and then a built-in electric field may thus be formed inside the driving transistor. As such, the threshold voltage of the driving transistor may continuously increase. The threshold voltage drift may lead to unstable display brightness when pictures are switched, and human eyes may perceive screen flicker. That is, the hysteresis effect of the driving transistor may be an important factor affecting the display quality. The threshold voltage drift caused by the hysteresis effect may be at a nanosecond level, while the threshold compensation performed by the threshold compensation module in the pixel circuit in existing technologies may be at a microsecond or millisecond level. Accordingly, the threshold compensation module in the existing pixel circuit may be unable to well compensate the threshold voltage drift caused by the hysteresis effect. Since the driving transistor in the pixel circuit operates in a forward bias state to provide driving current to the light-emitting element, when the driving transistor operates in the forward biased state for a long time, the threshold value voltage may drift, and the display quality may thus be affected.

In one embodiment, the pixel circuit 10 may further include a bias adjustment module 103. A first terminal of the bias adjustment module 103 is electrically connected to the bias adjustment signal Vbias. A second terminal of the bias adjustment module 103 is electrically connected to the first electrode of the driving transistor DT. The bias adjustment module 103 may be used to provide the bias adjustment signal Vbias to the first electrode of the driving transistor DT, to adjust the bias state of the driving transistor DT. By controlling the bias adjustment module 103 to input the bias adjustment signal Vbias to the first electrode of the driving transistor DT at a period when the pixel circuit 10 is working, the bias state of the driving transistor DT may be adjusted. Accordingly, the problem of threshold value drift of the driving transistor DT may be alleviated, and the display quality may thus be improved. The present disclosure does not specifically limit the operation time of the bias adjustment module 103, provided that the bias adjustment module 103 is operated before the light-emitting element 20 emits light.

In one embodiment, the bias adjustment signal Vbias may be provided by a bias signal line (not shown in FIGS. 1 and 2) in the display panel 000. In some other embodiments, the bias adjustment signal Vbias may multiplex the driving signal included in the pixel circuit 10. For example, data signals may be multiplexed for bias adjustment. In one embodiment, when bias adjustment is performed on a present row, the data signal of the next row may be multiplexed to adjust the bias voltage of the driving transistor DT of the present row. For details, reference may be made to bias adjustment structures in the related art.

The present disclosure does not limit the electrical connection structure of the pixel circuits 10 of the sub-pixels 00 in the display panel 000. In one embodiment, the pixel circuit 10 may also include other structures, such as a reset module for resetting, a light-emitting control module for controlling the light-emitting element 20 to emit light, etc. For details, reference may be made to circuit structures of OLED display panels in the related art.

In one embodiment, the first electrode of the driving transistor DT is connected to the first power supply signal Vpvdd, and the second electrode of the driving transistor DT is connected to the second power supply signal Vpvee. Optionally, the light-emitting element 20 may be arranged between the second electrode of the driving transistor DT and the second power signal Vpvee. It may be understood that the first electrode of the driving transistor DT and the first power supply signal Vpvdd may be electrically connected in a plurality of ways. In one embodiment, there is no other structures between the first electrode of the driving transistor DT and the first power supply signal Vpvdd. The first electrode of the driving transistor DT may be directly connected to the first power supply signal Vpvdd to realize electrical connection. In some other embodiments, there are other structures between the first electrode of the driving transistor DT and the first power supply signal Vpvdd. For example, the pixel circuit 10 may further include a first light-emission control transistor connected to the first electrode of the driving transistor DT, etc. In this case, when the first light-emission control transistor is turned on, the electrical connection between the first electrode of the driving transistor DT and the first power supply signal Vpvdd may also be realized. The present disclosure does not limit the specific structure in which the first electrode of the driving transistor DT is electrically connected to the first power supply signal Vpvdd. Specific implementation may be achieved according to the actual design structure of the pixel circuit.

In one embodiment, the second electrode of the driving transistor DT is connected to the second power supply signal Vpvee. The pixel circuit 10 may further include a second light-emission control transistor connected to the second electrode of the driving transistor DT. In this case, when the second light-emission control transistor is turned on, the second electrode of the driving transistor DT may be electrically connected to the light-emitting element 20 and the second power supply signal Vpvee.

In one embodiment, the first power signal Vpvdd may be provided by a first power signal line (not shown in FIGS. 1 and 2) in the display panel 000. The second power signal Vpvee may be provided by a second power signal line (not shown in FIGS. 1 and 2) in the display panel 000. When the pixel circuit 10 drives the light-emitting element 20 electrically connected to the pixel circuit 10 to emit light, a electrical conduction path including the first power signal Vpvdd, the driving transistor DT, the light-emitting element 20 and the second power signal Vpvee, may be formed. The electrical conduction path may be used to make the driving transistor DT generate driving current for driving the light-emitting element 20 to emit light. The light-emitting effect of the light-emitting element 20 may thus be realized.

In one embodiment, the first power signal Vpvdd connected to the first electrode of the driving transistor DT in the pixel circuit 10 may be set as a fixed value. The second power signal Vpvee connected to the second electrode of the driving transistor DT may be set as a variable value. The power consumption of the pixel circuit 10 is mainly determined by the voltage difference formed between the first power signal Vpvdd and the second power signal Vpvee, multiplied by the driving current on the electrical conduction path. The driving current is affected by the brightness of the light-emitting display. Under certain light-emitting display brightness, to reduce the power consumption, the voltage difference between the first power signal Vpvdd and the second power signal Vpvee may be reduced. In one embodiment, the first power signal Vpvdd is set to be a fixed value, and the second power signal Vpvee is set to be a variable value. The voltage value of the second power signal Vpvee may be changed according to the brightness change required by the display panel 000. When the brightness of the light-emitting display required by the display panel 000 is reduced, a large voltage difference between the first power signal Vpvdd and the second power signal Vpvee may not be required. The voltage difference between the first power signal Vpvdd and the second power signal Vpvee may be reduced by increasing the voltage value of the second power signal Vpvee, and the power consumption of the panel may thus be reduced. When the required display brightness of the entire display panel 000 is high, the voltage difference between the first power signal Vpvdd and the second power signal Vpvee may be increased by reducing the voltage value of the second power signal Vpvee, to achieve the overall brightness of the display panel 000. When only a small area of the display panel 000 needs high light-emitting brightness, and the brightness of other areas is 0 or very dark, the value of the second power signal Vpvee may be increased, such that the voltage difference between the first power signal Vpvdd and the second power signal Vpvee may be decreased. For example, the voltage value of the second power signal Vpvee may be increased from 0V to 0.3V, and thus, the voltage difference between the first power signal Vpvdd and the second power signal Vpvee may be decreased. Accordingly, power consumption of the entire panel may be reduced.

The value of the second power supply signal Vpvee may be dynamically adjusted to reduce power consumption. During the operation of the pixel circuit 10, along with the dynamic change of the second power supply signal Vpvee, the potential of the second electrode of the driving transistor DT, that is, the third node N3 in FIG. 2, may change accordingly, and the bias characteristic of the driving transistor DT may also change. In this case, the bias adjustment signal Vbias with a fixed value may be used to adjust the bias state of the driving transistor DT. In the frame-holding stage of the operation of the pixel circuit 10, the working potential of the driving transistor DT is the potential of the gate of the driving transistor DT, that is, the first node N1, minus the voltage value of the first power supply signal Vpvdd minus the potential of the third node N3. The potential of the third node N3 is directly related to the second power signal Vpvee. When the display panel 000 dynamically adjusts the value of the second power supply signal Vpvee to reduce power consumption, the potential of the third node N3 may also change dynamically. In this way, the dynamic change of the potential of the third node N3 may cause the working potential of the driving transistor DT, that is, the potential of the first node N1 to change, thus causing the bias characteristic of the driving transistor DT to change. Accordingly, when the pixel circuit 10 is working in the frame-holding stage, the state of the driving transistor DT may also change, deviations in brightness may appear, and thus the display quality of the display panel 000 may be affected.

In one embodiment, to reduce the power consumption of the panel while keeping the display quality, the bias adjustment signal Vbias may be set as a variable value. That is, the bias adjustment signal Vbias input through the bias adjustment module 103 may change following the change of the second power supply signal Vpvee. Thus, the bias state of the driving transistor DT may be adjusted by using the bias adjustment signal Vbias input through the bias adjustment module 103. Specifically, when the bias adjustment module 103 is turned on, the bias adjustment signal Vbias may be applied to the first electrode of the driving transistor DT, that is, the second node N2. Since the driving transistor DT is turned on, the bias adjustment signal Vbias may be also transmitted to the second electrode of the driving transistor DT, that is, the third node N3. Since the threshold compensation module 102 is also turned on at this time, the bias adjustment signal Vbias may be written into the gate of the driving transistor DT, that is, the first node N1. Since the bias adjustment signal Vbias has a high voltage value, that is, regardless of the picture displayed in the previous frame, when writing the present picture, the driving transistor DT needs to be written one time with the bias adjustment signal Vbias. In this way, the bias effect of the previous frame of picture may be weakened. Accordingly, when writing the present picture, the state of the driving transistor DT may be closer to the preset state. As such, the bias voltage difference of the driving transistor DT when the present frame of picture and the previous frame of picture are displayed may be reduced. Accordingly, the threshold voltage drift problem of the driving transistor DT may be alleviated, and the display quality may thus be improved.

The change of the second power signal Vpvee may reduce the power consumption of the panel. In one embodiment, the second power supply signal Vpvee dynamically changes according to the requirement for display brightness. When the second power supply signal Vpvee is used to reduce the panel power consumption, the bias adjustment signal Vbias input through the bias adjustment module 103 may also change dynamically following the second power supply signal Vpvee. For example, when the brightness required by the display panel 000 is low, and the voltage difference between the first power signal Vpvdd and the second power signal Vpvee needs to be reduced, the second power signal Vpvee may be increased. When the second power signal Vpvee is increased, the potential of the third node N3 may be also increased. The working potential of the driving transistor DT is the potential of the gate of the driving transistor DT, that is, the first node N1, minus the voltage value of the first power supply signal Vpvdd, and then minus the potential of the third node N3. Accordingly, the working potential of the driving transistor DT may decrease. After the decrease of the working potential of the driving transistor DT, the negative bias voltage (ie, reverse bias) to the driving transistor DT may be equivalently enhanced when the pixel circuit 10 controls the light-emitting stage of the light-emitting element 20. As such, to achieve the adjustment effect on the bias state of the driving transistor DT, the negative bias state of the driving transistor DT may be weakened. That is, at this time, the voltage value of the bias adjustment signal Vbias may be reduced. Accordingly, the deviation of the light-emitting brightness of the light-emitting element 20 from the original required brightness, due to the change of the second power supply signal Vpvee, may be avoided, and the display quality of the display panel 000 may thus be improved.

When the display panel 000 is an OLED display panel, the layout of the signal lines in the display panel 000 may be complicated. In addition to the data lines S shown in FIG. 1, the display panel 000 may also include other signal lines, such as scan lines, reference voltage lines, and power signal lines (not shown in FIG. 1). One sub-pixel row may correspond to a plurality of scan lines. For implementation, the layout of the signal lines may be configured according to actual situations.

In one embodiment, the driving transistor DT in the pixel circuit 10 is a P-type transistor. In some other embodiments, the driving transistors DT may be other types of transistors. The present disclosure does not limit the types of the driving transistor DT.

It should be noted that the display panel 000 may be an OLED display panel. FIGS. 1 and 2 are only exemplary drawings of the structure of the display panel. During specific implementation, the structure of the display panel 000 may include but is not limited to the structures shown in FIGS. 1 and 2. The structure of the display panel 000 may also include other structures capable of realizing display functions. For details, reference may be made to structures of OLED display panels in the related art. The present disclosure will not go into details here.

In some embodiments, with continuous reference to FIGS. 1 and 2, the change trend of the display brightness of the display panel 000 is inversely proportional to the change trend of the second power signal Vpvee. The change trend of the bias adjustment signal Vbias is inversely proportional to the change trend of the second power signal Vpvee. Optionally, when the value of the second power signal Vpvee increases, the value of the bias adjustment signal Vbias decreases.

In one embodiment, the power consumption of the pixel circuit 10 is mainly determined by the voltage difference formed between the first power signal Vpvdd and the second power signal Vpvee times the driving current on the electrical conduction path. The driving current is affected by the light-emitting display brightness. Under certain light-emitting display brightness, power consumption may be reduced by reducing the voltage difference formed between the first power signal Vpvdd and the second power signal Vpvee. The power consumption of the light-emitting element 20 may be calculated by using P=UI, where P represents the power consumption of the light-emitting element 20, U represents the voltage difference formed between the first power signal Vpvdd and the second power signal Vpvee, and I represents the drive current flowing through the electrical conduction path formed by the driving transistor DT and the light-emitting element 20 between the first power supply signal Vpvdd and the second power supply signal Vpvee. When the display brightness of the display panel 000 is constant, that is, the drive current I does not change, the smaller the voltage difference U between the first power signal Vpvdd and the second power signal Vpvee is, the smaller the power consumption P of the light-emitting element 20 is. Thus, according to the change of the display brightness of the display panel 000, the value of the second power signal Vpvee may be dynamically adjusted. Accordingly, the power consumption of the light-emitting element 20 may be reduced, and the overall power consumption of the display panel 000 may thus be reduced. As such, the first power signal Vpvdd may be set to be a fixed value, and the second power signal Vpvee may be set to be a variable value.

The voltage value of the second power signal Vpvee may change following the brightness change required by the display panel 000. The change trend of display brightness of the display panel 000 is inversely proportional to the change trend of the second power signal Vpvee. When the brightness of the light-emitting display required by the display panel 000 is reduced, a large voltage difference between the first power signal Vpvdd and the second power signal Vpvee may not be required. The voltage difference between the first power signal Vpvdd and the second power signal Vpvee may be reduced by increasing the voltage value of the second power signal Vpvee. When the light-emitting display brightness required by the entire display panel 000 is high, the voltage difference between the first power signal Vpvdd and the second power signal Vpvee may be increased by reducing the voltage value of the second power signal Vpvee to achieve the overall brightness of the display panel 000. That is, when the display brightness required by the display panel 000 is high, reducing the voltage value of the second power signal Vpvee may increase the voltage difference between the first power signal Vpvdd and the second power signal Vpvee. When the display brightness required by the display panel 000 is low, increasing the voltage value of the second power signal Vpvee may reduce the voltage difference between the first power signal Vpvdd and the second power signal Vpvee. The change trend of the display brightness of the display panel 000 is inversely proportional to the change trend of the second power signal Vpvee. Dynamically adjusting the value of the second power signal Vpvee according to the display brightness may save the overall power consumption of the display panel. When the bias adjustment signal Vbias changes dynamically following the second power signal Vpvee, the change trend of the bias adjustment signal Vbias is inversely proportional to the change trend of the second power signal Vpvee.

Optionally, when the value of the second power supply signal Vpvee increases, the value of the bias adjustment signal Vbias may decrease. When the brightness required by the display panel 000 is low, and the voltage difference between the first power signal Vpvdd and the second power signal Vpvee needs to be reduced, the second power signal Vpvee may be increased. When the second power signal Vpvee is increased, the potential of the second electrode of the driving transistor DT, that is, the third node N3, may also be increased. Accordingly, the working potential of the driving transistor DT is the potential of the gate of the driving transistor DT, that is, the first node N1, minus the voltage value of the first power supply signal Vpvdd, and then minus the potential of the third node N3. As such, the working potential of the driving transistor DT may decrease. After the decrease of the working potential of the driving transistor DT, the negative bias voltage (ie, reverse bias) to the driving transistor DT may be equivalently enhanced when the pixel circuit 10 controls the light-emitting stage of the light-emitting element 20. To achieve the adjustment effect on the bias state of the driving transistor DT, the negative bias state of the driving transistor DT may be weakened. That is, at this time, the voltage value of the bias adjustment signal Vbias may be reduced. That is, when the value of the second power signal Vpvee is increased, the value of the bias adjustment signal Vbias may decrease accordingly, such that the change trend of the bias adjustment signal Vbias may be inversely proportional to the change trend of the second power signal Vpvee. Accordingly, the deviation of the light-emitting brightness of the light-emitting element 20 from the original required brightness, due to the change of the second power supply signal Vpvee, may be avoided, and the display quality of the display panel 000 may thus be improved.

In some embodiments, with continuous reference to FIGS. 1 and 2, the value of the second power signal Vpvee may increase by ΔA, and the value of the bias adjustment signal Vbias may decrease by ΔB, with ΔB≤0.5 ΔA.

In one embodiment, the bias adjustment signal Vbias may dynamically change following the second power signal Vpvee, and the change trend of the bias adjustment signal Vbias may be inversely proportional to the change trend of the second power supply signal Vpvee. The increase of the value of the second power signal Vpvee may be set to be ΔA, and the decrease of the value of the bias adjustment signal Vbias may be set to be ΔB, with ΔB≤0.5 ΔA. That is, the change of the bias adjustment signal Vbias may be half of the change of the second power supply signal Vpvee, or the change of the bias adjustment signal Vbias may be smaller than the change of the second power supply signal Vpvee.

When the second power supply signal Vpvee is dynamically adjusted, the change of the second power supply signal Vpvee may only cause the potential change of the second electrode of the driving transistor DT, that is, the third node N3. The potential of the first electrode of the driving transistor DT, that is, the second node N2, may not change. However, when the bias adjustment signal Vbias is dynamically adjusted, and applied through the bias adjustment module 103, the bias adjustment signal Vbias may be simultaneously applied to the first electrode of the driving transistor DT, that is, the second node N2, and the second electrode of the driving transistor DT, that is, the third node N3. That is, when the value of the bias adjustment signal Vbias applied through the bias adjustment module 103 changes, each of the potentials of the second node N2 and the third node N3 may change. Accordingly, the change value of the bias adjustment signal Vbias may be set to be smaller than the change value of the second power signal Vpvee. Specifically, the change of the bias adjustment signal Vbias may be half of the change of the second power supply signal Vpvee, or the change of the bias adjustment signal Vbias may be smaller than the change of the second power supply signal Vpvee. In this way, effects of the adjustment of bias voltage may be improved. The deviation of the light-emitting brightness of the light-emitting element 20 from the original required brightness, due to the change of the second power signal Vpvee, may be avoided. Accordingly, while the display quality of the display panel 000 may be improved, the change of the bias adjustment signal Vbias may be reduced, and the waste of power consumption caused by the excessive change range of the bias adjustment signal Vbias may thus be avoided.

Figure 3:
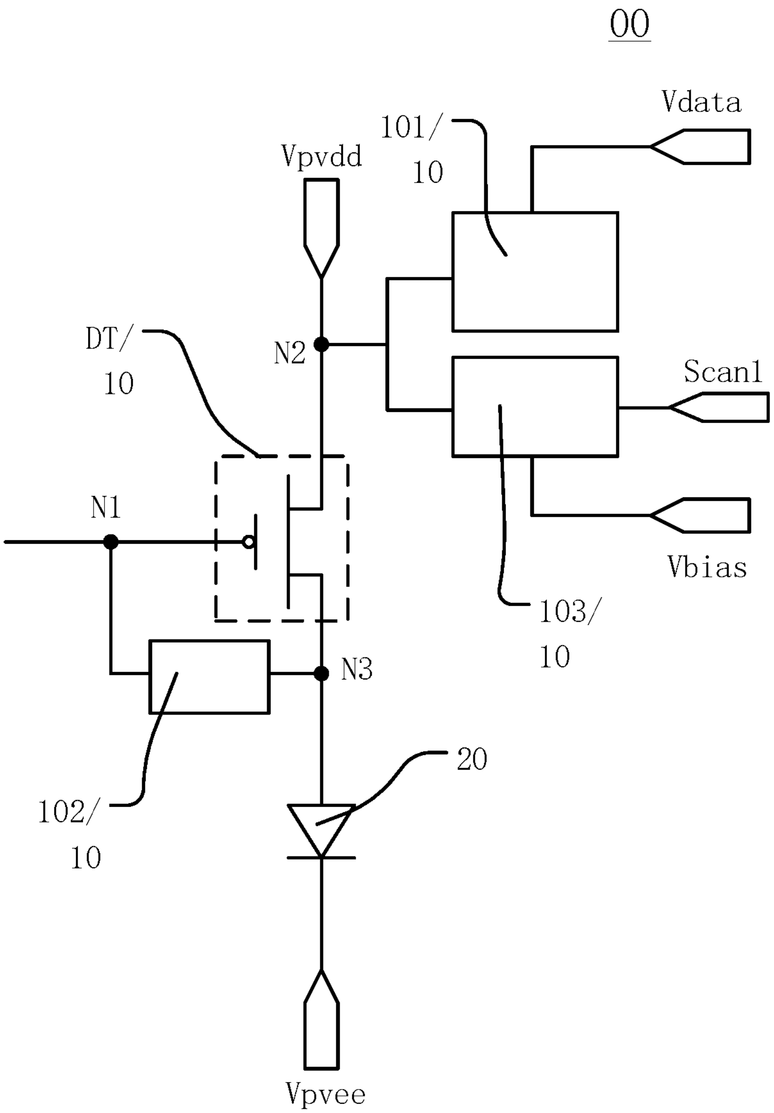
FIG. 3 illustrates another schematic structural diagram of circuit connection of a sub-pixel in FIG. 1, consistent with the disclosed embodiments of the present disclosure.

FIG. 3 illustrates another schematic structural diagram of circuit connection of a sub-pixel in FIG. 1. In some embodiments, with reference to FIGS. 1 and 3, the control terminal of the bias adjustment module 103 may be electrically connected to a first scanning signal Scan1. The bias adjustment module 103 is configured to provide the bias adjustment signal Vbias to the first electrode of the driving transistor DT, that is, the second node N2, under the control of the effective electric level of the first scan signal Scan1.

In one embodiment, the display panel 000 may include a plurality of first scanning signal lines (not shown in FIGS. 1 and 3). The first scan signal lines may be used to provide the first scan signal Scan1 to the control terminal of the bias adjustment module 103. Under the control of the effective electric level of the first scanning signal Scan1, the bias adjustment module 103 may be turned on. Thus, the bias adjustment signal Vbias may be transmitted to the first electrode of the driving transistor DT, that is, the second node N2, through the bias adjustment module 103, to adjust the bias state of the driving transistor DT. Accordingly, the problem of threshold voltage drift of the driving transistor DT may be alleviated, and the display quality improve may thus be improved.

In one embodiment, the effective electric level of the first scan signal Scan1 provided by the first scan signal lines may be understood as a voltage signal capable of turning on the bias adjustment module 103. The ineffective electric level of the first scan signal Scan1 may be understood as a voltage signal capable of turning off the bias adjustment module 103. When the bias adjustment module 103 includes a P-type transistor, the control terminal of the bias adjustment module 103 may be understood as the gate of the P-type transistor. In this case, the effective electric level of the first scanning signal Scan1 is a low-level voltage signal. When the bias adjustment module 103 includes an N-type transistor, the control terminal of the bias adjustment module 103 may be understood as the gate of the N-type transistor. In this case, the effective electric level of the first scanning signal Scan1 is a high-level voltage signal. The present disclosure does not specifically limit the effective electric level of the first scanning signal Scan1. The effective electric level of the first scanning signal Scan1 may be selected according to the specific structure of the pixel circuit 10, provided that the bias adjustment module 103 may be turned on under the control of the effective electric level of the first scanning signal Scan1.

Figure 4:
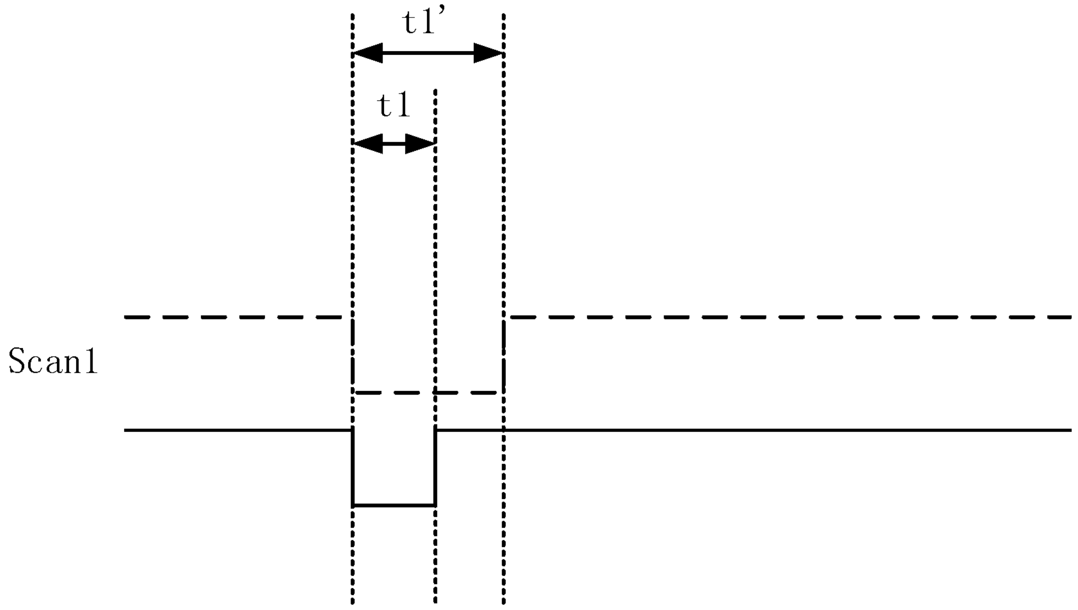
FIG. 4 illustrates a comparison chart of a change trend of an effective electric level of a first scanning signal in FIG. 3, consistent with the disclosed embodiments of the present disclosure.

FIG. 4 illustrates a comparison chart of a change trend of an effective electric level of a first scanning signal in FIG. 3. In one embodiment, with reference to FIGS. 1, 3 and 4 together, when the value of the second power signal Vpvee increases, the maintenance time of the effective electric level of the first scanning signal Scan1 may decrease. As an example, and for purpose of explanation, the effective electric level of the first scanning signal Scan1 in FIG. 4 is a low electric level.

In one embodiment, the bias adjustment signal Vbias may dynamically change following the second power signal Vpvee. The change trend of the bias adjustment signal Vbias may be inversely proportional to the change trend of the second power signal Vpvee. The bias adjustment effect of the bias adjustment signal Vbias on the driving transistor DT may be controlled by adjusting the time duration of the effective electric level of the first scan signal Scan1. As shown in FIG. 4, the dotted line represents the maintenance time t1' of the effective electric level of the first scanning signal Scan1 originally required to adjust the bias state of the driving transistor DT. The solid line indicates that when the value of the second power supply signal Vpvee is dynamically adjusted to increase and the bias adjustment signal Vbias decreases accordingly, the maintenance time of the effective electric level of the first scanning signal Scan1 required by the bias state of the driving transistor DT is t1, and t1 is less than t1'. When the value of the second power supply signal Vpvee is dynamically adjusted to increase, the maintenance time of the effective electric level of the first scan signal Scan1 may be reduced.

In one embodiment, when using the bias adjustment signal Vbias originally set for adjusting the bias state of the driving transistor DT, the required maintenance time of the effective electric level of the first scanning signal Scan1 is t1'. After the value of the second power supply signal Vpvee increases, the value of the bias adjustment signal Vbias may need to be decreased. In this case, the maintenance time of the effective electric level of the first scanning signal Scan1 may be reduced to t1. That is, reducing the conduction time of the bias adjustment module 103 may decrease the value of the bias adjustment signal Vbias.

When the bias adjustment module 103 is turned on under the control of the effective electric level of the first scan signal Scan1, the bias effect may be strong. When the bias adjustment module 103 is turned off, that is, the first scan signal Scan1 becomes ineffective, the bias adjustment process may only depend on the parasitic capacitance on the second node N2 to maintain the bias effect. Since the parasitic capacitance may leak slowly, the effect of the negative bias on the driving transistor DT may be weakened. That is, decreasing the maintenance time of the effective electric level of the first scanning signal Scan1 may weaken the effect of the negative bias on the driving transistor DT in the bias adjustment stage. As such, when the value of the second power supply signal Vpvee is increased, the value of the bias adjustment signal Vbias may decrease accordingly, and the adjustment effect on the bias state of the driving transistor DT may still be achieved. As a result, the deviation of the light-emitting brightness of the light-emitting element 20 from the originally required brightness, due to the change of the second power signal Vpvee, may be avoided, and the display quality of the display panel 000 may thus be improved.

Figure 5:
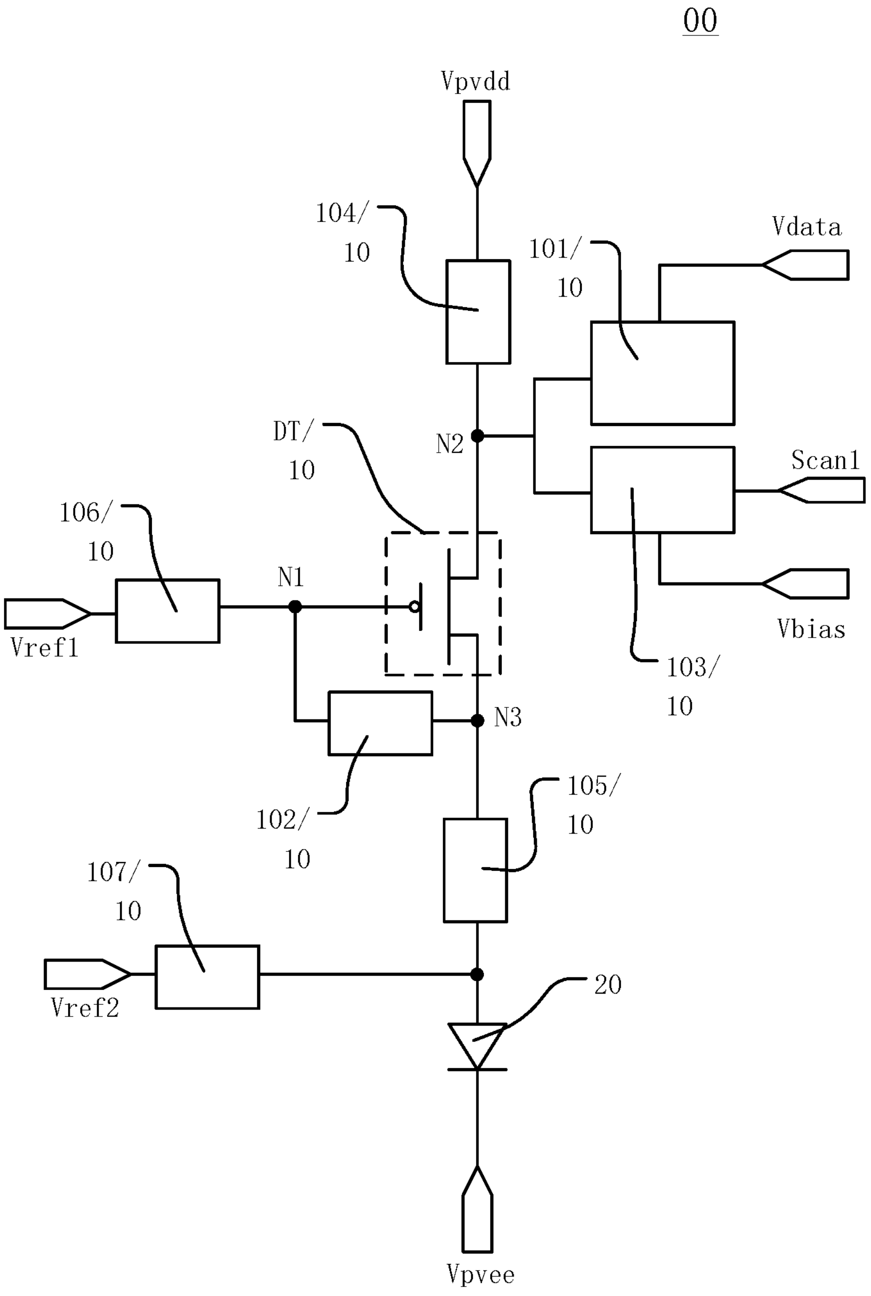
FIG. 5 illustrates another schematic structural diagram of circuit connection of a sub-pixel in FIG. 1, consistent with the disclosed embodiments of the present disclosure.

FIG. 5 illustrates another schematic structural diagram of circuit connection of the sub-pixel in FIG. 1. In some embodiments, with reference to FIG. 1 and FIG. 5, the pixel circuit 10 may also include a first light-emitting control module 104, a second light-emitting control module 105, a first reset module 106, and a second reset module 107.

The first terminal of the first light-emitting control module 104 is electrically connected to the first power supply signal Vpvdd. The second terminal of the first light-emitting control module 104 is electrically connected to the first electrode of the driving transistor DT. The first terminal of the second light-emitting control module 105 is electrically connected to the first electrode of the driving transistor DT. The second terminal of the second light-emitting control module 105 is electrically connected to the light-emitting element 20.

The first terminal of the first reset module 106 is electrically connected to a first reset signal Vref1. The second terminal of the first reset module 106 is electrically connected to the gate of the driving transistor DT. The first terminal of the second reset module 107 is electrically connected to a second reset signal Vref2. The second terminal of the second reset module 107 is electrically connected to the light-emitting element 20.

The present disclosure provides a module connection structure between the pixel circuit 10 and the light-emitting element 20 for each sub-pixel P. Optionally, the pixel circuit 10 includes a data input module 101 and a bias adjustment module 103 connected to the first electrode of the driving transistor DT, and a threshold compensation module 102 connected between the gate and the second electrode of the driving transistor DT. The pixel circuit 10 also includes a first light-emitting control module 104, a second light-emitting control module 105, a first reset module 106 and a second reset module 107. When the pixel circuit 10 is working in a light-emitting stage, the first light-emitting control module 104 and the second light-emitting control module 105 are turned on, a conduction circuit may be formed between the first power signal Vpvdd and the second power signal Vpvee, and the light-emitting element 20 may emit light. The first light-emitting control module 104 and the second light-emitting control module 105 may cooperate to provide driving current to the light-emitting element 20. The first light-emitting control module 104 is turned on, and the positive voltage signal provided by the first power signal Vpvdd is supplied to the first electrode of the driving transistor DT. The driving transistor DT is turned on under the control of the gate voltage of the driving transistor DT, and the voltage signal of the first electrode of the driving transistor DT is provided to the second electrode of the driving transistor DT. The second light-emitting control module 105 is turned on, and provides the voltage signal of the second electrode of the driving transistor DT to the light-emitting element 20, such that the driving current may flow through the light-emitting element 20, controlling the light-emitting element 20 to emit light.

When the data input module 101 is turned on, the data signal Vdata on the data line S may be transmitted to the driving transistor DT. When the bias adjustment module 103 is turned on, the bias adjustment signal Vbias provided by the bias voltage signal line may be transmitted to the driving transistor DT, such that the bias state of the driving transistor DT may be adjusted. When the threshold compensation module 102 is turned on, threshold compensation may be performed on the driving transistor DT. When the first reset module 106 is turned on, the gate potential of the driving transistor DT may be the first reset signal Vref1, and may reset the gate of the driving transistor DT, such that the driving transistor DT may be turned on during the threshold compensation. When the second reset module 107 is turned on, the potential of the anode of the light-emitting element 20 may be the second reset signal Vref2. The second reset signal Vref2 may initialize the anode of the light-emitting element 20, such that the residual of the data signal of the previous frame may be alleviated. Accordingly, the residual image phenomenon may be alleviated, and the display quality of the display panel 000 may thus be improved. Optionally, the first reset signal Vref1 and the second reset signal Vref2 may be same or different. During specific implementation, the first reset signal Vref1 and the second reset signal Vref2 may be set according to actual needs.

In one embodiment, magnitudes of the dynamic adjustment of the second power signal Vpvee and the bias adjustment signal Vbias may be directly adjusted through the second power signal line that inputs the second power signal Vpvee and the bias voltage signal line that inputs the bias adjustment signal Vbias. For example, the second power signal line and the bias voltage signal line may be connected to a driving chip or a flexible circuit board bound on the display panel 000. The potential signal input through the input pad of the driving chip or the flexible circuit board may directly change the dynamic value of the second power supply signal Vpvee and the bias adjustment signal Vbias. Alternatively, the dynamic adjustment of the bias adjustment signal Vbias may also be performed by changing the conduction time of the bias adjustment module 103. For example, controlling the maintenance time of the effective electric level of the first scanning signal Scan1 may also change the value of the bias adjustment signal Vbias to follow the dynamic change of the second power signal Vpvee, and the display quality of the display panel 000 may thus be improved. The present disclosure does not limit the way of dynamic adjustment.

Figure 6:
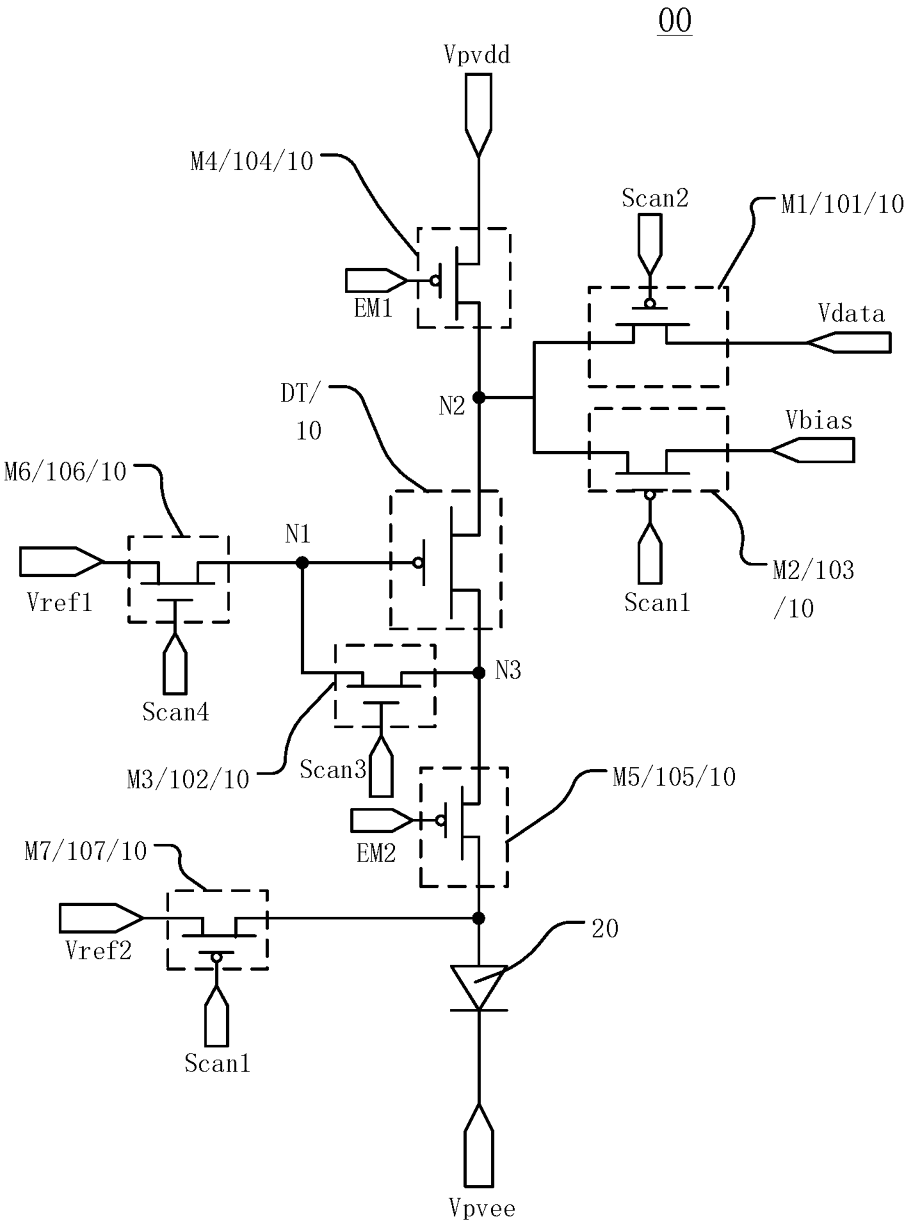
FIG. 6 illustrates another schematic structural diagram of circuit connection of a sub-pixel in FIG. 1, consistent with the disclosed embodiments of the present disclosure.

FIG. 6 illustrates another schematic structural diagram of circuit connection of a sub-pixel in FIG. 1. In one embodiment, as shown in FIGS. 1 and 6, the data input module 101 may include a first transistor M1. The gate of the first transistor M1 is electrically connected to a second scanning signal Scan2. The source of the first transistor M1 is electrically connected to the data signal Vdata. The drain of the first transistor M1 is electrically connected to the first electrode of the driving transistor DT.

The bias adjustment module 103 may include a second transistor M2. The gate of the second transistor M2 is electrically connected to the first scan signal Scan1. The source of the second transistor M2 is electrically connected to the bias adjustment signal Vbias. The drain of the second transistor M2 is electrically connected to the first electrode of the driving transistor DT.

The threshold compensation module 102 may include a third transistor M3. The gate of the third transistor M3 is electrically connected to a third scan signal Scan3. The source of the third transistor M3 is electrically connected to the gate of the driving transistor DT. The drain of the third transistor M3 is electrically connected to the second electrode of the driving transistor DT.

The first light-emitting control module 104 may include a fourth transistor M4. The gate of the fourth transistor M4 is electrically connected to a first light-emitting control signal EM1. The source of the fourth transistor M4 is electrically connected to the first power supply signal Vpvdd. The drain of the fourth transistor M4 is electrically connected to the first electrode of the driving transistor DT.

The second light-emitting control module 105 may include a fifth transistor M5. The gate of the fifth transistor M5 is electrically connected to a second light-emitting control signal EM2. The source of the fifth transistor M5 is electrically connected to the second electrode of the driving transistor DT. The drain of the fifth transistor M5 is electrically connected to the anode of the light-emitting element 20.

The first reset module 106 may include a sixth transistor M6. The gate of the sixth transistor M6 is electrically connected to the fourth scan signal Scan4. The source of the sixth transistor M6 is electrically connected to the first reset signal Vref1. The drain of the sixth transistor M6 is electrically connected to the gate of the driving transistor DT.

The second reset module 107 may include a seventh transistor M7. The gate of the seventh transistor M7 is electrically connected to the first scan signal Scan1. The source of the seventh transistor M7 is electrically connected to the second reset signal Vref2. The drain of the seventh transistor M7 is electrically connected to the anode of the light-emitting element 20.

In one embodiment, the pixel circuit 10 may further include a storage capacitor C. One end of the storage capacitor C is connected to the first power supply signal Vpvdd, and the other end of the storage capacitor C is connected to the gate of the driving transistor DT. The storage capacitor C may be used to stabilize the potential of the gate of the driving transistor DT, and the driving transistor DT may thus be kept being turned on.

In one embodiment, each of the third transistor M3 and the sixth transistor M6 connected to the gate of the driving transistor DT is an N-type metal oxide transistor. Each of the first transistor M1, the second transistor M2, the fourth transistor M4, the fifth transistor M5, the seventh transistor M7 and the driving transistor DT is a P-type low-temperature polysilicon transistor.

In one embodiment, the third transistor M3 and the sixth transistor M6 may be N-type metal oxide transistors. The third transistor M3 is electrically connected to the gate of the driving transistor DT. The sixth transistor M6 is also electrically connected to the gate of the driving transistor DT. Metal-oxide transistors may have low leakage current in the off state, thus reducing the influence of leakage current on the gate potential of the driving transistor DT. In this way, the gate voltage of the driving transistor DT may be stabilized, and the working stability of the driving transistor DT may be improved. Accordingly, stability of the driving current may be improved, and thus uniformity of the light-emitting brightness of the light-emitting element 20 in the display panel 000 may be improved.

When the display panel 000 performs low-frequency drive display, the display time of a frame of picture may be long, and the potential of the driving transistor DT may need to be maintained for a long time. If the transistor connected to the gate of the driving transistor DT is a low-temperature polysilicon transistor, since a low-temperature polysilicon transistor may have a large off-state leakage current, the leakage current of the transistor connected to the gate of the driving transistor DT may have great influence on the potential of the gate of the driving transistor DT. Obvious flicker may thus appear. As such, in one embodiment, the third transistor M3 and the sixth transistor M6 are set to be N-type metal oxide transistors. Since N-type metal oxide transistors may have small off-state leakage current, the potential of the gate of the driving transistor DT may be maintained for a long time when the display panel 000 performs low-frequency drive display. Accordingly, the flicker phenomenon when driving at low frequency may be alleviated, and the display quality may thus be improved.

Figure 7:
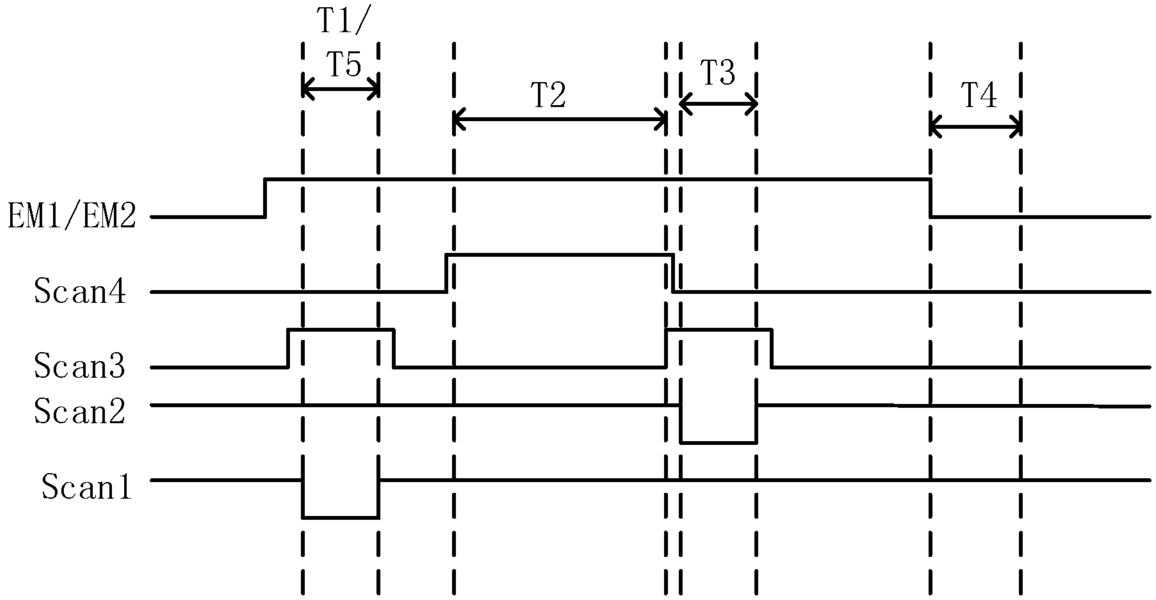
FIG. 7 illustrates a working sequence diagram of a pixel circuit in FIG. 6, consistent with the disclosed embodiments of the present disclosure.

FIG. 7 illustrates a working sequence diagram of a pixel circuit in FIG. 6. As shown in FIG. 6 and FIG. 7, in one embodiment, in the sub-pixel P, the working process of the pixel circuit 10 may include a first bias adjustment stage T1, a reset stage T2, a threshold compensation and data input stage T3, and a light-emitting stage T4.

In the first bias adjustment stage T1, that is, before the gate of the driving transistor DT is reset, the first scan signal Scan1 may input a low electric level signal to control the second transistor M2 of the bias adjustment module 103 to be turned on. The high potential signal of the third scan signal Scan3 may control the third transistor M3 of the threshold compensation module 102 to be turned on. The bias adjustment signal Vbias may be transmitted to the driving transistor DT through the second transistor M2 to adjust the bias state of the driving transistor DT. Accordingly, the driving transistor DT may be reverse biased, driving the first electrode and the second electrode of the driving transistor DT to reverse. As such, the degree of ion polarization inside the driving transistor DT may be weakened, and the threshold voltage of the driving transistor DT may be lowered. Accordingly, the threshold voltage of the driving transistor DT may be adjusted by biasing the driving transistor DT, and the problem of threshold voltage drift caused by the hysteresis effect of the driving transistor due to the forward bias state of the driving transistor DT may thus be compensated.

Optionally, the bias adjustment signal Vbias may be a DC positive voltage signal. The bias adjustment signal Vbias may be a high positive voltage value. That is, no matter what the picture displayed in the previous frame is, before the gate of the driving transistor DT is reset, when inputting the present frame of picture, the driving transistor DT needs to be inputted with the bias adjustment signal Vbias one time. Accordingly, the sub-pixel 00 may experience the input of a same bias adjustment signal Vbias one time before the gate of the driving transistor DT is reset, and the bias adjustment signal Vbias inputted may be a high positive voltage value. As such, a large instantaneous current may flow through the driving transistor DT. The large instantaneous current may adjust the bias defect problem inside the driving transistor DT, and may improve the hysteresis characteristics of the driving transistor DT, thus weakening the bias effect of the picture displayed in the previous frame. As a result, when inputting the present frame of picture, the state of the driving transistor DT may be close to the preset state, and the bias voltage difference of the driving transistor DT between displaying the present frame of picture and displaying the previous frame of picture may be decreased. Accordingly, the problem of threshold voltage drift of the driving transistor DT may be alleviated, and the display quality may thus be improved.

In the reset stage T2, the fourth scan signal Scan4 may provide an effective electrical signal. When the sixth transistor M6 is an N-type metal oxide transistor, under the high potential signal, the fourth scanning signal Scan4 may control the sixth transistor M6 of the first reset module 106 to be turned on, and the first reset signal Vref1 may reset the gate of the driving transistor DT.

In the threshold compensation and data input stage T3, the second scanning signal line Scan2 may provide a low electric level signal to control the first transistor M1 of the data input module 101 to be turned on. The high potential signal of the third scanning signal Scan3 may control the third transistor M3 of the threshold compensation module 102 to be turned on. The threshold-compensated data voltage signal provided by the data line S may be transmitted to the gate of the driving transistor DT through the first transistor M1, the driving transistor DT, and the third transistor M3, and provide threshold compensation to the driving transistor DT. Accordingly, the deviation of the threshold voltage of the driving transistor DT may be compensated.

In the light-emitting stage T4, the first light-emitting control signal EM1 provides a low electric level signal to control the fourth transistor M4 of the first light-emitting control module 104 to be turned on. The second light-emitting control signal EM2 provides a low electric level signal to control the fifth transistor M5 of the second light-emitting control module 105 to be turned on. The driving transistor DT generates driving current under the control of the gate voltage of the driving transistor DT. The first light-emitting control signal EM1 and the second light-emitting control signal EM2 may be provided by a same light-emitting control signal line. An electrical conduction path may be formed among the first power signal Vpvdd, the fourth transistor M4, the driving transistor DT, the fifth transistor M5, the light-emitting element 20, and the second power signal Vpvee. Accordingly, the driving current may be provided to the light-emitting element 20. The driving current may flow through the light-emitting element 20, and control the light-emitting element 20 to emit light.

It should be noted that, during specific implementation, the connection structure of the pixel circuit 10 may include but is not limited to the structures and driving sequences provided in the present disclosure. Other connection structures and driving sequences may also be used.

In one embodiment, the low electric level signal of the first scan signal Scan1 may also control the seventh transistor M7 of the second reset module 107 to be turned on. The second reset signal Vref2 may reset the anode of the light-emitting element 20 through the seventh transistor M7, such that the anode of the light-emitting element 20 may be initialized. Accordingly, the residual of the previous frame of data signal of may be alleviated, the residual image phenomenon may be alleviated, and the display quality of the display panel 000 may thus be improved.

In one embodiment, the working stages of the pixel circuit 10 may also include a power adjustment stage T5. The power adjustment stage T5 may be used to dynamically adjust the value of the second power signal Vpvee according to the display brightness required by the display panel 000. When the brightness required by the display panel 000 is low, the voltage difference between the first power signal Vpvdd and the second power signal Vpvee may need to be reduced. In this case, the value of the second power signal Vpvee may be increased through the second power signal line in the power adjustment stage T5, and the voltage difference between the first power signal Vpvdd and the second power signal Vpvee may thus be reduced to decrease the power consumption.

In one embodiment, the operation time of the power adjustment stage T5 and the operation time of the first bias adjustment stage T1 may be set to overlap at least partially. That is, when the second power supply signal Vpvee is dynamically adjusted in the power adjustment stage T5, the bias adjustment signal Vbias may be adjusted synchronously and the operation of the first bias voltage adjustment stage T1 may be performed. Specifically, the synchronous adjustment of the bias adjustment signal Vbias means that when the second power signal Vpvee is increased, the potential of the third node N3 may be also increased. The working potential of the driving transistor DT is a value of the potential of the gate of the driving transistor DT, that is, the first node N1, minus the voltage value of the first power supply signal Vpvdd and then minus the potential of the third node N3. Accordingly, the working potential of the driving transistor DT may decrease. After the decrease of the working potential of the driving transistor DT, the negative bias voltage (that is, the reverse bias) to the driving transistor DT may be equivalently enhanced at the light-emitting stage when the pixel circuit 10 controls the light-emitting element 20. As such, to improve the adjustment effect on the bias state of the driving transistor DT, the negative bias state of the driving transistor DT may need to be weakened. That is, in this case, the voltage value of the bias adjustment signal Vbias may be reduced, and the bias state of the driving transistor DT may be adjusted by using the reduced bias adjustment signal Vbias. Accordingly, the deviation of the light-emitting brightness of the light-emitting element 20 from the original required brightness, due to the change of the second power signal Vpvee, may be avoided, and the display quality of the display panel 000 may thus be improved.

In one embodiment, in the working stages of the pixel circuit 10, the operation time of the power adjustment stage T5 and the operation time of the first bias adjustment stage T1 may partially overlap. During specific implementation, the power adjustment stage T5 for dynamically adjusting the second power signal Vpvee is not limited to a period partially overlapping with the operation time of the first bias adjustment stage T1. For example, dynamically adjusting the second power signal Vpvee may also be performed in the light-emitting stage T4 of the light-emitting element 20. The present disclosure does not specifically limit the operation time of the power adjustment stage T5.

Figure 8:
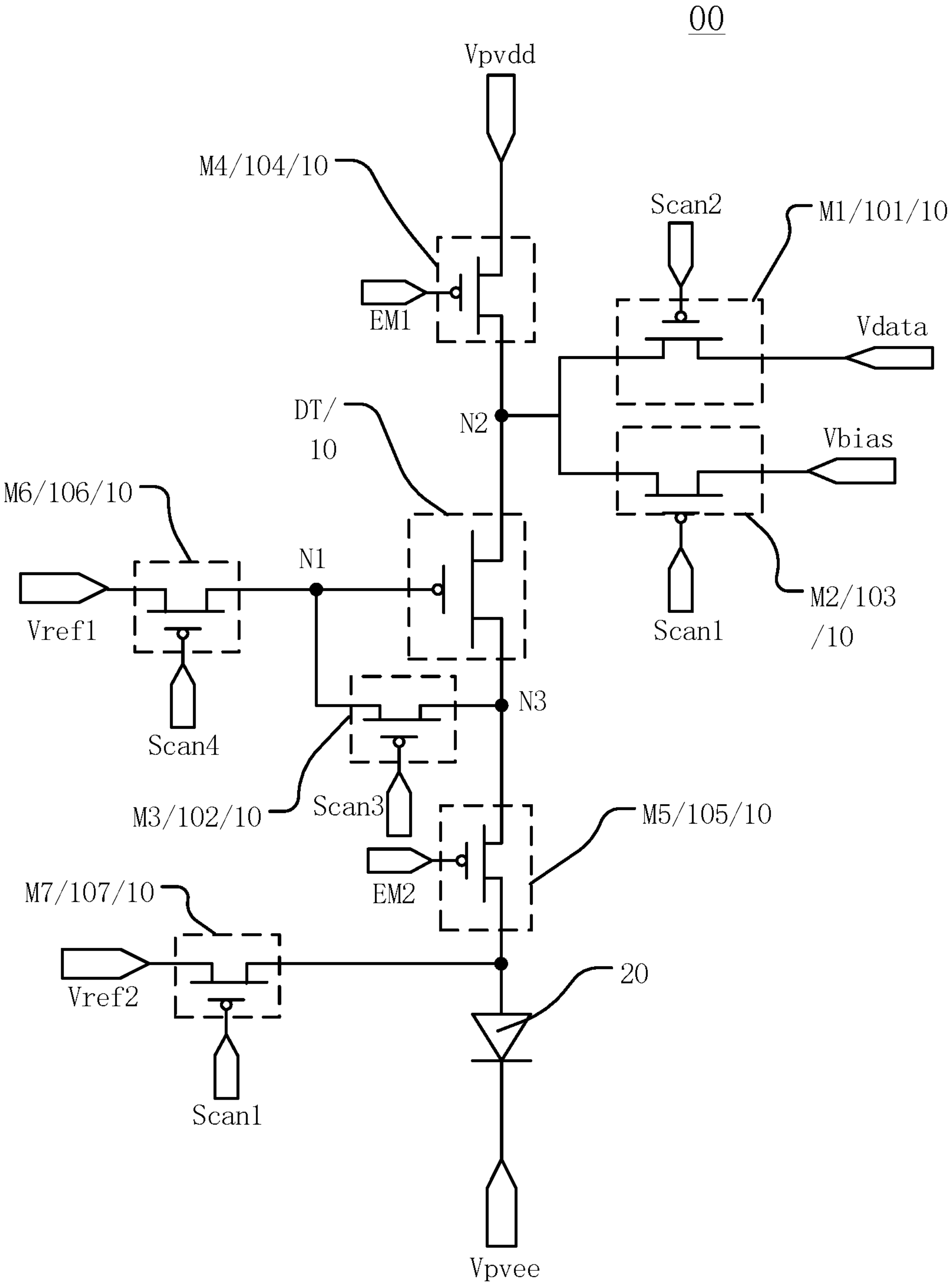
FIG. 8 illustrates another schematic structural diagram of circuit connection of a sub-pixel in FIG. 1, consistent with the disclosed embodiments of the present disclosure.

FIG. 8 illustrates another schematic structural diagram of circuit connection of a sub-pixel in FIG. 1. In some embodiments, with reference to FIGS. 1 and 8, each of the first transistor M1, the second transistor M2, the third transistor M3, the fourth transistor M4, the fifth transistor M5, the sixth transistor M6, the seventh transistor M7 and the driving transistor DT is a P-type low-temperature polysilicon transistor.

In one embodiment, each of the transistors included in the pixel circuit 10 may be a P-type transistor, such as a P-type low-temperature polysilicon transistor. When each of the transistors in the pixel circuit 10 is a P-type transistor, because of the characteristics of high mobility and high driving speed of low-temperature polysilicon transistors, when the data input module 101 inputs in a data signal, the response speed of the driving transistor DT may be fast. As such, the data signal may be input quickly, and insufficient charging caused by the driving transistor DT being turned on for a long time may thus be avoided.

It should be noted that, when each of the transistors in the pixel circuit 10 is a P-type transistor, polarities of the driving signals corresponding to the third scanning signal Scan3 and the fourth scanning signal Scan4 may need to be changed. With reference to FIG. 7, change of the polarities of the driving signals may be achieved by reversing the polarities of the third scan signal Scan3 connected to the gate of the third transistor M3 and the fourth scan signal Scan4 connected to the gate of the sixth transistor M6. The driving process for the third transistor M3 and the sixth transistor M6 as P-type transistors may then be applied. The present disclosure will not go into details about the driving sequence for a case in which each of the transistors in the pixel circuit 10 is a P-type transistor. For details, reference may be made to driving principles of pixel circuits in the related art.

Figure 9:
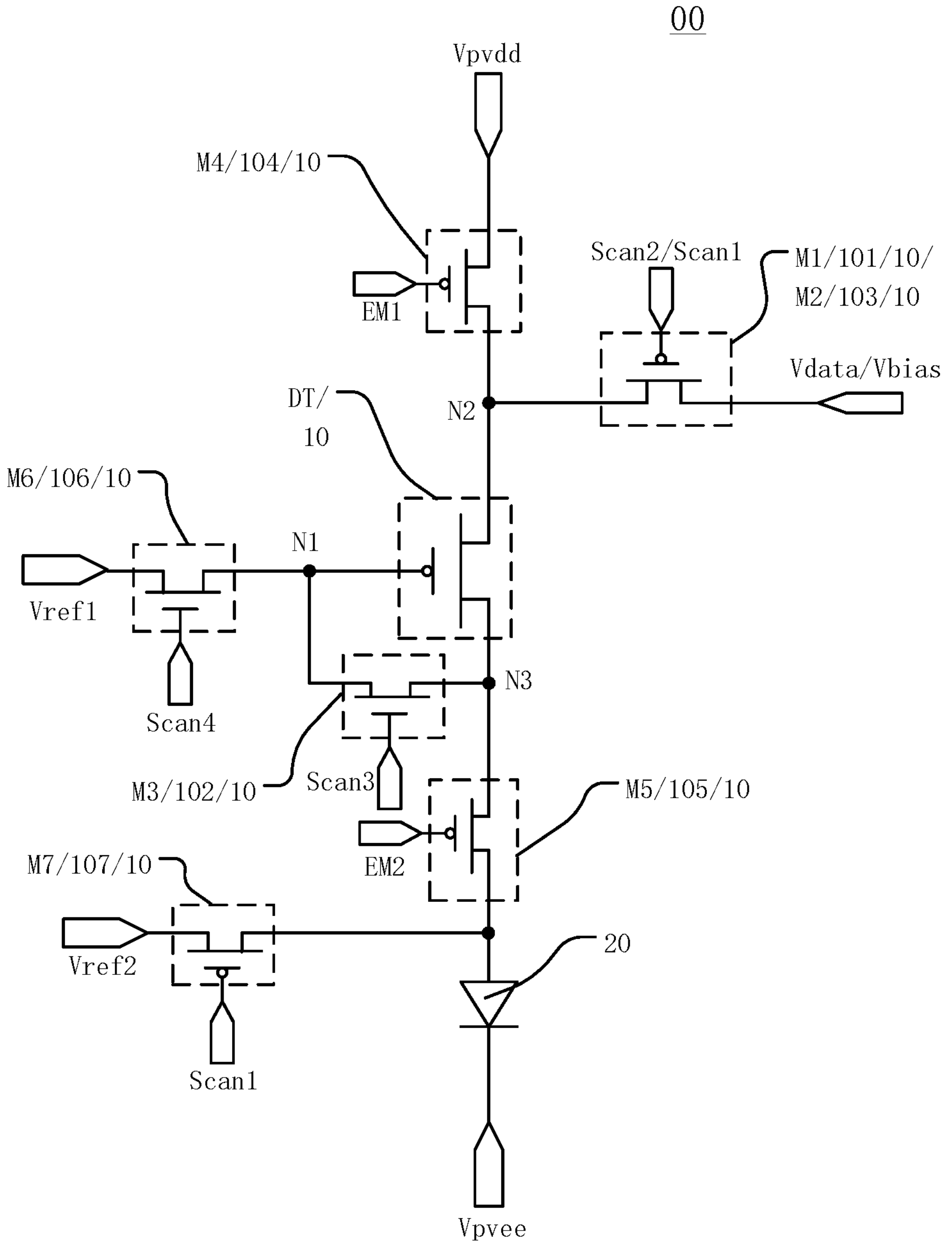
FIG. 9 illustrates another schematic structural diagram of circuit connection of a sub-pixel in FIG. 1, consistent with the disclosed embodiments of the present disclosure.
Figure 10:
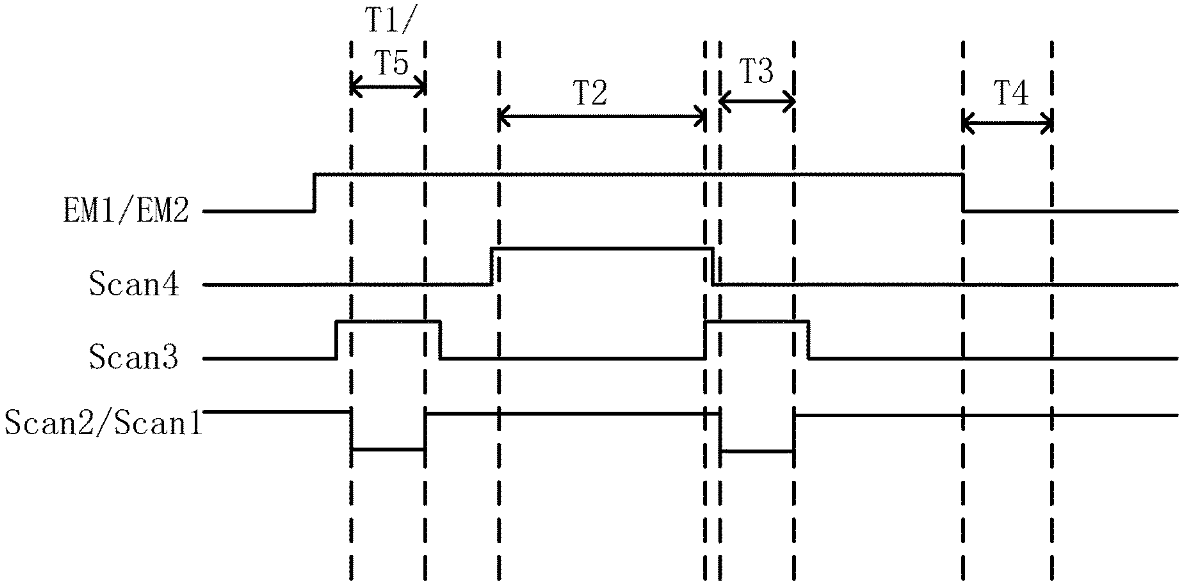
FIG. 10 illustrates a working sequence diagram of a pixel circuit in FIG. 9, consistent with the disclosed embodiments of the present disclosure.

FIG. 9 illustrates another schematic structural diagram of circuit connection of a sub-pixel in FIG. 1. FIG. 10 illustrates a working sequence diagram of a pixel circuit in FIG. 9. In one embodiment, as shown in FIGS. 1, 9 and 10, the data input module 101 may be multiplexed as the bias adjustment module 103, and the data signal Vdata may be multiplexed as the bias adjustment signal Vbias.

In one embodiment, the data input module 101 in the pixel circuit 10 may be multiplexed as the bias adjustment module 103. That is, in the first bias adjustment stage T1, the data signal Vdata may be multiplexed as the bias adjustment signal Vbias to adjust the bias voltage of the driving transistor DT. By multiplexing the data input module 101 as the bias adjustment module 103, the number of transistors in the pixel circuit 10 may be reduced. In addition, the first scanning signal and the second scanning signal in FIGS. 6 and 7 may also be multiplexed. Accordingly, the number of scanning lines in the display panel 000 may be reduced, and the aperture ratio of the sub-pixels 00 in the panel may thus be improved.

Figure 11:
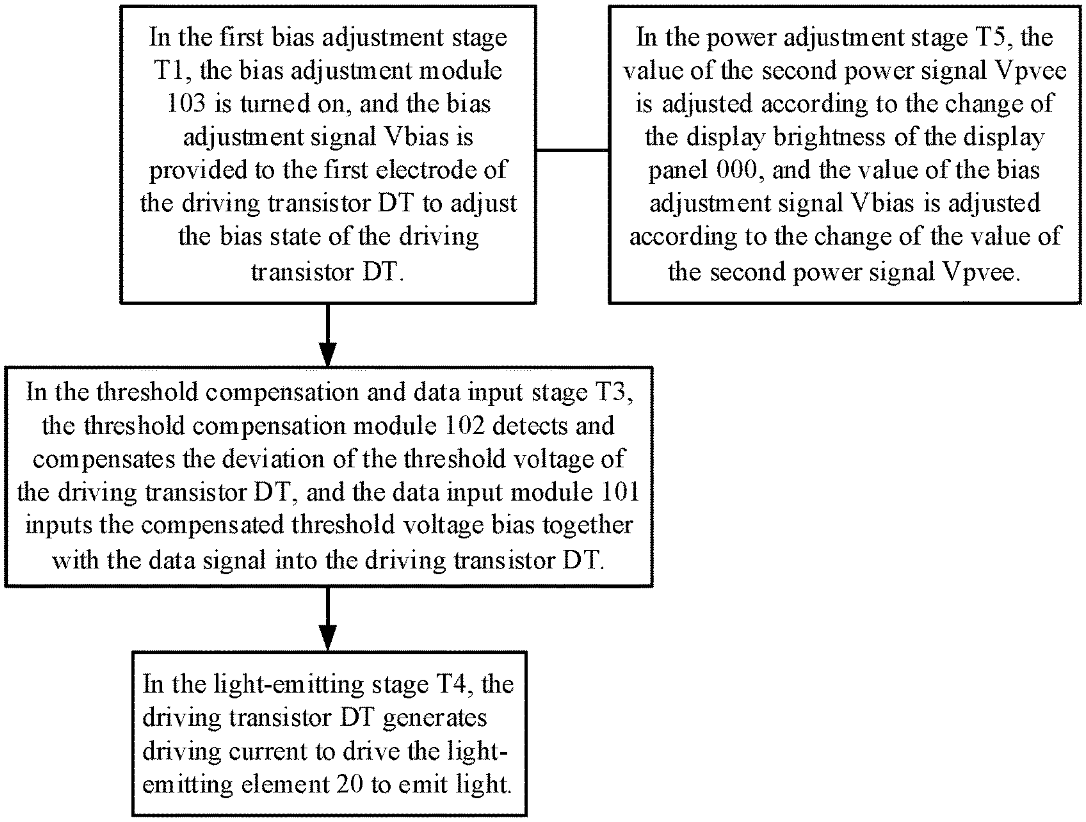
FIG. 11 illustrates a flowchart of a driving method consistent with the disclosed embodiments of the present disclosure.

FIG. 11 illustrates a flowchart of a driving method consistent with the disclosed embodiments of the present disclosure. The present disclosure also provides a driving method of a display panel. Referring to FIGS. 1-7 and 11, the driving method may be applied to the display panel 000 provided in the present disclosure. The driving method includes a first bias adjustment stage T1, a threshold compensation and data input stage T3, and a light-emitting stage T4. The first bias adjustment stage T1 is executed before the threshold compensation and data input stage T3.

In the first bias adjustment stage T1, the bias adjustment module 103 may be turned on, and the bias adjustment signal Vbias may be provided to the first electrode of the driving transistor DT to adjust the bias state of the driving transistor DT.

In the threshold compensation and data input stage T3, the threshold compensation module 102 may detect and compensate the deviation of the threshold voltage of the driving transistor DT, and the data input module 101 may input the compensated threshold voltage bias together with the data signal into the driving transistor DT.

In the light-emitting stage T4, the driving transistor DT may generate driving current to drive the light-emitting element 20 to emit light.

In one embodiment, the driving method may further include a power adjustment stage T5. In the power adjustment stage T5, the value of the second power signal Vpvee may be adjusted according to the change of the display brightness of the display panel 000, and the value of the bias adjustment signal Vbias may be adjusted according to the change of the value of the second power signal Vpvee.

The power consumption of the pixel circuit 10 is mainly determined by the voltage difference formed between the first power signal Vpvdd and the second power signal Vpvee times the driving current on the electrical conduction path. The driving current may be affected by the brightness of the light-emitting display. In the power adjustment stage T5, the value of the second power signal Vpvee may be adjusted according to the change of the display brightness of the display panel 000. When the brightness of the light-emitting display required by the display panel 000 is reduced, a large voltage difference between the first power signal Vpvdd and the second power signal Vpvee may not be required. The voltage difference between the first power signal Vpvdd and the second power signal Vpvee may be reduced by increasing the voltage value of the second power signal Vpvee, and power consumption of the panel may thus be reduced. When the light-emitting display brightness required by the entire display panel 000 is high, the voltage difference between the first power signal Vpvdd and the second power signal Vpvee may be increased by reducing the voltage value of the second power signal Vpvee. As such, the overall brightness of the display panel 000 may be achieved, and the power consumption of the entire panel may be reduced.

Optionally, the operation time of the power adjustment stage T5 and the operation time of the first bias adjustment stage T1 may at least partially overlap. That is, in the driving method, in the power adjustment stage T5, the value of the bias adjustment signal Vbias may be adjusted according to the change of the value of the second power signal Vpvee. That is, the bias adjustment signal Vbias inputted through the bias adjustment module 103 may change following the change of the second power supply signal Vpvee. Specifically, when the bias adjustment module 103 is turned on, the bias adjustment signal Vbias is applied to the first electrode of the driving transistor DT, that is, the second node N2. Since the driving transistor DT is turned on, the bias adjustment signal Vbias is also transmitted to the second electrode of the driving transistor DT, that is, the third node N3. Since the threshold compensation module 102 is also turned on at this time, the bias adjustment signal Vbias is inputted into the gate of the driving transistor DT, that is, the first node N1. The bias adjustment signal Vbias is a high voltage value, that is, no matter what the picture displayed in the previous frame is, when writing the present frame of picture, the driving transistor DT needs to be inputted with the bias adjustment signal Vbias one time. In this way, the bias effect of the previous frame of picture displayed may be weakened, and the state of the driving transistor DT may be close to the preset state when writing the present frame of picture. Accordingly, the bias voltage difference of the driving transistor DT between displaying the present frame of picture and displaying the previous frame of picture may be reduced. As such, the problem of threshold voltage drift of the driving transistor DT may be alleviated, and the display quality may thus be improved.

In one embodiment, according to the requirement of the brightness of light-emitting display, the power consumption of the panel may be reduced by dynamically changing the second power supply signal Vpvee. When the second power supply signal Vpvee is dynamically changed, the bias adjustment signal Vbias inputted through the bias adjustment module 103 may also dynamically change following the second power supply signal Vpvee. Accordingly, the deviation of the light-emitting brightness of the light-emitting element 20 from the originally required brightness due to the change of the second power signal Vpvee may be avoided, and the display quality of the display panel 000 may thus be improved.

Optionally, with continuous reference to FIGS. 1-7 and 11, the driving method may also include a reset stage T2. The reset stage T2 may be performed between the first bias adjustment stage T1 and the threshold compensation and data input stage T3. Optionally, the reset stage T2 may be used to reset the gate of the driving transistor DT.

In one embodiment, before the reset stage T2, that is, before the gate of the driving transistor DT is reset, the first scan signal Scan1 may be made to input a low electric level signal to control the second transistor M2 of the bias adjustment module 103 to be turned on. The high potential signal of the third scanning signal Scan3 may control the third transistor M3 of the threshold compensation module 102 to be turned on. As such, the bias adjustment signal Vbias may be transmitted to the driving transistor DT through the second transistor M2 to adjust the bias state of the driving transistor DT. In this way, the driving transistor DT may be reverse biased, and the first electrode and the second electrode of the driving transistor DT may be reversed. As a result, the degree of ion polarization inside the driving transistor DT may be weakened, and the threshold voltage of the driving transistor DT may be reduced. Accordingly, by biasing the driving transistor DT, the adjustment of the threshold voltage of the driving transistor DT may be realized, and the problem of threshold voltage drift caused by the hysteresis effect of the driving transistor due to the forward bias state of the driving transistor DT may thus be compensated.

Due to the hysteresis characteristics, when switching between a black picture and a white picture, due to different bias effects of the black picture and the white picture on the driving transistor DT, the bias states of the driving transistor DT may be different, and smearing effects may appear. For example, when a black picture is switched to a white picture, the brightness of the first few frames of the white picture may be darker than the required brightness, and thus smearing effects may appear. In one embodiment, the reset stage T2 may be executed between the first bias adjustment stage T1 and the threshold compensation and data input stage T3. The work of the first bias adjustment stage T1 may be performed before resetting the gate of the driving transistor DT. Since the bias adjustment signal Vbias is a high positive voltage value, no matter what the picture displayed in the previous frame is, before the gate of the driving transistor DT is reset, the driving transistor DT needs to be inputted with the bias adjustment signal Vbias one time when writing the present picture. In this way, the bias effect of the previous frame of picture may be weakened, such that the state of the driving transistor DT may be close to the preset state when writing the present frame of picture. As such, the bias voltage difference of the driving transistor DT between displaying the present frame of picture and displaying the previous frame of picture may be reduced, and the problem of threshold voltage drift of the driving transistor DT may thus be alleviated. Accordingly, the smearing problem in display when switching between black and white pictures may be eased, and the display quality may thus be improved.

Figure 12:
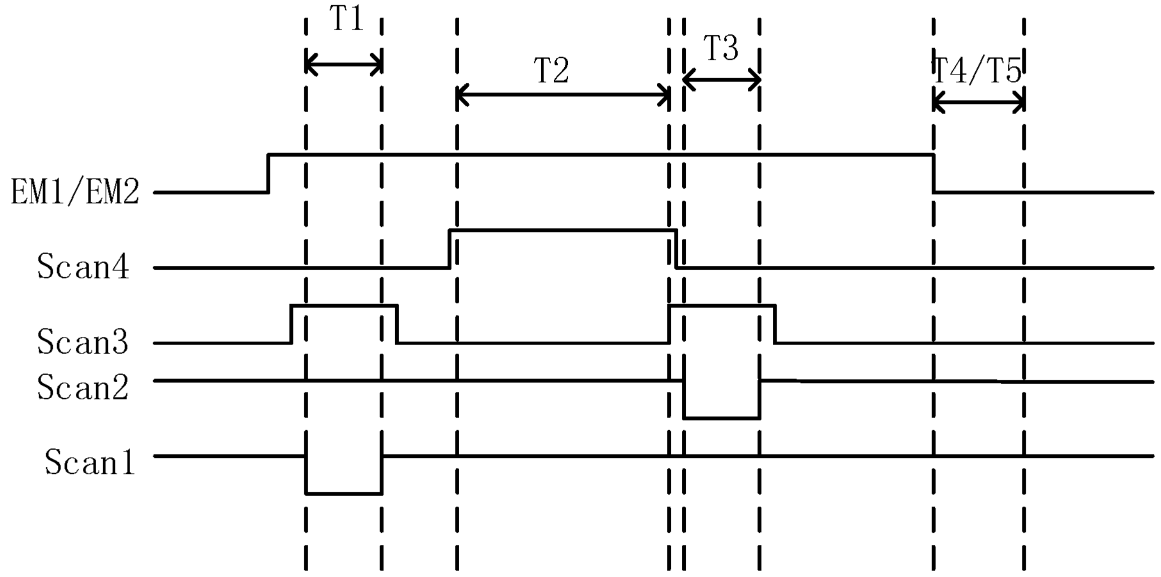
FIG. 12 illustrates another working sequence diagram of a pixel circuit in FIG. 6, consistent with the disclosed embodiments of the present disclosure.

FIG. 12 illustrates another working sequence diagram of a pixel circuit in FIG. 6. In some embodiments, with reference to FIGS. 1, 6 and 12, in the driving method, the operation time of the power adjustment stage T5 and the operation time of the light-emitting stage T4 may at least partially overlap.

In one embodiment, the operation time of the power adjustment stage T5 for dynamically adjusting the second power signal Vpvee may at least partially overlap with the operation time of the light-emitting stage T4. When the brightness required by the display panel 000 is low, and the voltage difference between the first power signal Vpvdd and the second power signal Vpvee needs to be reduced, the second power signal Vpvee may be increased. When the second power signal Vpvee is increased, the potential of the third node N3 may also be increased. Accordingly, the working potential of the driving transistor DT is a value of the potential of the gate of the driving transistor DT, that is, the potential of the first node N1, minus the voltage value of the first power supply signal Vpvdd, and then minus the potential of the third node N3, and the working potential of the driving transistor DT may decrease. After the decrease of the working potential of the driving transistor DT, the negative bias voltage (that is, the reverse bias) to the driving transistor DT may be equivalently enhanced in the light-emitting stage T4 when the pixel circuit 10 controls the light-emitting element 20. Accordingly, the bias adjustment signal Vbias may be adjusted synchronously in the light-emitting stage T4. If the second power supply signal Vpvee is increased in the light-emitting stage T4, the bias adjustment signal Vbias may be synchronously reduced in the light-emitting stage T4 to weaken the negative bias state of the driving transistor DT. That is, in this case, by reducing the voltage value of the bias adjustment signal Vbias, the deviation of the light-emitting brightness of the light-emitting element 20 from the original required brightness due to the change of the second power signal Vpvee may be avoided. The display quality of the display panel 000 may thus be improved.

Figure 13:
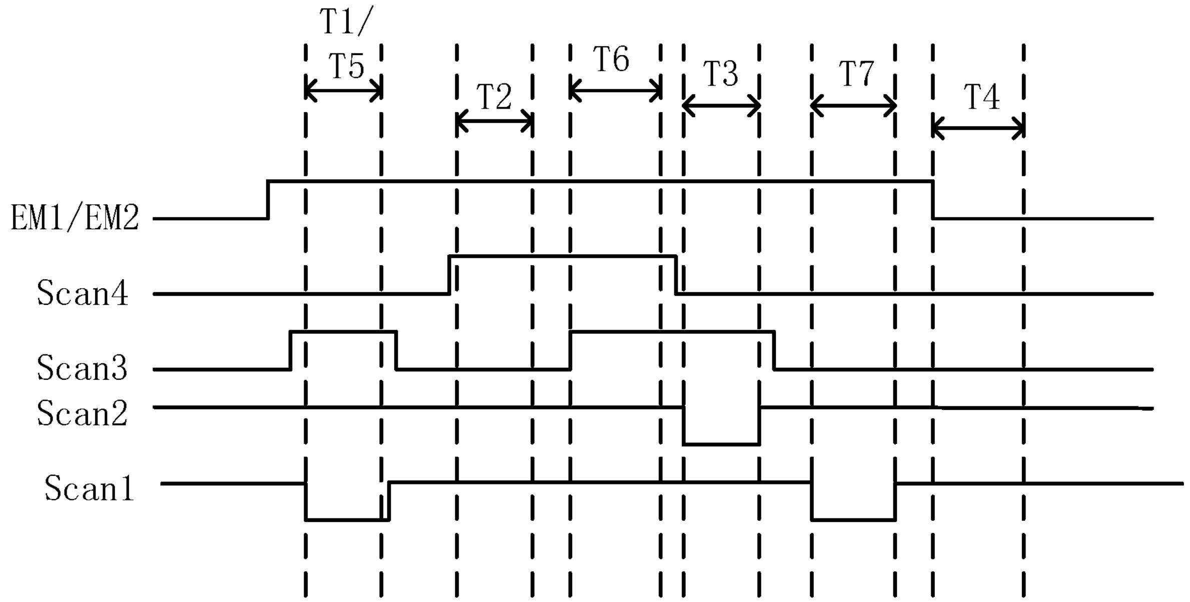
FIG. 13 illustrates another working sequence diagram of a pixel circuit in FIG. 6, consistent with the disclosed embodiments of the present disclosure.

FIG. 13 illustrates another working sequence diagram of a pixel circuit in FIG. 6. In some embodiments, with reference to FIGS. 1, 6 and 13, the driving method may further include a second bias adjustment stage T6 and a third bias adjustment stage T7. The second bias adjustment stage T6 may be performed between the reset stage T2 and the threshold compensation and data input stage T3. The third bias adjustment stage T7 may be performed between the threshold compensation and data input stage T3 and the light-emitting stage T4.

In one embodiment, the working process of the pixel circuit 10 may include at least the first bias adjustment stage T1, the reset stage T2, the second bias adjustment stage T6, the threshold compensation and data input stage T3, the third bias adjustment stage T7, and the light-emitting stage T4.

In the first bias adjustment stage T1, that is, before the gate of the driving transistor DT is reset, the first scan signal Scan1 may be made to input a low electric level signal to control the second transistor M2 of the bias adjustment module 103 to be turned on. The high potential signal of the third scanning signal Scan3 may control the third transistor M3 of the threshold compensation module 102 to be turned on. The bias adjustment signal Vbias may then be transmitted to the driving transistor DT through the second transistor M2, to adjust the bias state of the driving transistor DT. As such, the driving transistor DT may be reverse biased, and the first electrode and the second electrode of the driving transistor DT may be reversed. Accordingly, the degree of ion polarization inside the driving transistor DT may be weakened, and the threshold voltage of the driving transistor DT may be reduced. Thus, by biasing the driving transistor DT, the threshold voltage of the driving transistor DT may be the adjusted, and the problem of threshold voltage drift caused by the hysteresis effect of the driving transistor due to the forward bias state of the driving transistor DT may be compensated.

Optionally, the bias adjustment signal Vbias may be a DC positive voltage signal. Since the bias adjustment signal Vbias is a high positive voltage value, no matter what the picture displayed in the previous frame is, before the gate of the driving transistor DT is reset, the driving transistor DT needs to be inputted with a bias adjustment signal Vbias one time when writing the present picture. In this way, the bias effect of the previous frame of picture may be weakened, such that the state of the driving transistor DT may be close to the preset state when writing the present frame of picture. As such, the bias voltage difference of the driving transistor DT between displaying the present frame of picture and displaying the previous frame of picture may be alleviated. Accordingly, the problem of threshold voltage drift of the driving transistor DT may be eased, and the display quality may thus be improved.

In the reset stage T2, the fourth scan signal Scan4 may be an effective electrical signal. When the sixth transistor M6 is an N-type metal oxide transistor, the fourth scanning signal Scan4 may control the sixth transistor M6 of the first reset module 106 to be turned on under the high potential signal. The first reset signal Vref1 may reset the gate of the driving transistor DT.

In the second bias adjustment stage T6, that is, before the threshold compensation and data input stage T3, the fourth scan signal Scan4 may be made to be an effective electrical signal. When the sixth transistor M6 is an N-type metal oxide transistor, the fourth scanning signal Scan4 may control the sixth transistor M6 of the first reset module 106 to be turned on under the high potential signal. The high potential signal of the third scanning signal Scan3 may control the third transistor M3 of the threshold compensation module 102 to be turned on. The first reset signal Vref1 may be input into the second node N2 and the third node N3, and the potential difference between the second node N2 (that is, the first electrode of the driving transistor DT) and the third node N3 (the second electrode of the driving transistor DT) may be eliminated. Accordingly, the difference in the bias state of the driving transistor DT due to the potential difference between the second node N2 and the third node N3 caused by different pictures may be avoided. Further, when the data voltage signals are inputted subsequently, the states of the gate, the first electrode and the second electrode of the driving transistor DT may be close to the required states.

In one embodiment, in the second bias adjustment stage T6, the value of the bias adjustment signal Vbias may be changed such that the voltage values of the gate of the driving transistor DT, the first electrode of the driving transistor DT, and the second electrode of the driving transistor DT may be equal.

In one embodiment, a second bias adjustment stage T6 may be added before the threshold compensation and data input stage T3. In the second bias adjustment stage T6, by changing the input value of the bias adjustment signal Vbias, the potentials of the first node N1, the second node N2, and the third node N3 may be set to be same. That is, through the second bias adjustment stage T6 added, the value of the bias adjustment signal Vbias may be changed, such that the voltage values of the gate of the driving transistor DT, the first electrode of the driving transistor DT, and the second electrode of the driving transistor DT may be made to be equal. Accordingly, the bias voltage difference of the driving transistor DT before threshold compensation may be reduced, and the effect of adjusting the bias voltage of the driving transistor DT may be improved.

In the threshold compensation and data input stage T3, the second scanning signal line Scan2 may input a low electric level signal to control the first transistor M1 of the data input module 101 to be turned on. The high potential signal of the third scanning signal Scan3 may control the third transistor M3 of the threshold compensation module 102 to be turned on. The data voltage signal after threshold compensation, provided by the data line S, may be transmitted to the gate of the driving transistor DT through the first transistor M1, the driving transistor DT, and the third transistor M3. The threshold compensation may thus be performed to the driving transistor DT, that is, the deviation of the threshold voltage of the driving transistor DT may be compensated.

In the third bias adjustment stage T7, that is, after the threshold compensation and data input stage T3 and before the light-emitting stage T4, the pixel circuit 10 may perform the third bias adjustment stage T7. In the third bias adjustment stage T7, the first scan signal Scan1 may be controlled to input a low electric level signal, such that the second transistor M2 of the bias adjustment module 103 may be turned on. Accordingly, the bias adjustment signal Vbias may be provided to the second node N2, and the bias state of the driving transistor DT may thus be adjusted. In one embodiment, three bias adjustment stages are set in the working cycle of the pixel circuit 10, and the time for adjusting the bias state of the driving transistor DT may be increased in the driving cycle. Accordingly, the problem of threshold voltage drift of the driving transistor DT because of the hysteresis effect may be further alleviated.

In one embodiment, the third bias adjustment stage T7 may be performed after the threshold compensation and data input stage T3 and before the light-emitting stage T4 in the data input frame of the pixel circuit 10. In some other embodiments, the working process of the pixel circuit 10 may include a data input frame and a holding frame, and the third bias adjustment stage T7 may also be performed before the light-emitting stage of the holding frame. When the display panel 000 adopts a low-frequency driving mode, since the holding frame under the low-frequency driving mode may not include a data input stage, the state of the first electrode of the driving transistor DT, that is, the second node N2, in the holding frame may be different from the state of the second node N2 in the data input frame. To make the states of the second node N2 during the light-emitting stage of the holding frame and the light-emitting stage of the data input frame be close, a bias adjustment signal Vbias may be applied to the second node N2 during the light-emitting stage of the holding frame. That is, the first scan signal Scan1 may be controlled to input a low electric level signal such that the second transistor M2 of the bias adjustment module 103 may be turned on. As such, the bias adjustment signal Vbias may be provided to the second node N2, and thus bias adjustment of the driving transistor DT may be performed to fit the state at the data input frame. Similarly, the third bias adjustment stage T7 may also be performed before the light-emitting stage T4 of the data input frame, and the bias adjustment signal Vbias may be applied to the second node N2, such that the states of the second node N2 at the data input frame and at the holding frame may be close. Accordingly, the light-emitting difference may be eased, and the quality of light-emitting display may thus be improved.

In the light-emitting stage T4, the first light-emitting control signal EM1 may input a low electric level signal to control the fourth transistor M4 of the first light-emitting control module 104 to be turned on. The second light-emitting control signal EM2 may input a low electric level signal to control the fifth transistor M5 of the second light-emitting control module 105 to be turned on. The driving transistor DT may generate driving current under the control of the gate voltage of the driving transistor DT. The first light-emitting control signal EM1 and the second light-emitting control signal EM2 may be provided by a same light-emitting control signal line. An electrical conduction path may be formed among the first power signal Vpvdd, the fourth transistor M4, the driving transistor DT, the fifth transistor M5, the light-emitting element 20, and the second power signal Vpvee. The driving current may thus be supplied to the light-emitting element 20. Accordingly, the driving current may flow through the light-emitting element 20, and control the light-emitting element 20 to emit light.

It should be noted that, during specific implementation, the connection structure of the pixel circuit 10 may include but is not limited to the structures and driving sequences provided in the present disclosure. The connection structure of the pixel circuit 10 may also include other connection structures and driving methods. The present disclosure does not limit the connection structure of the pixel circuit 10.

Figure 14:
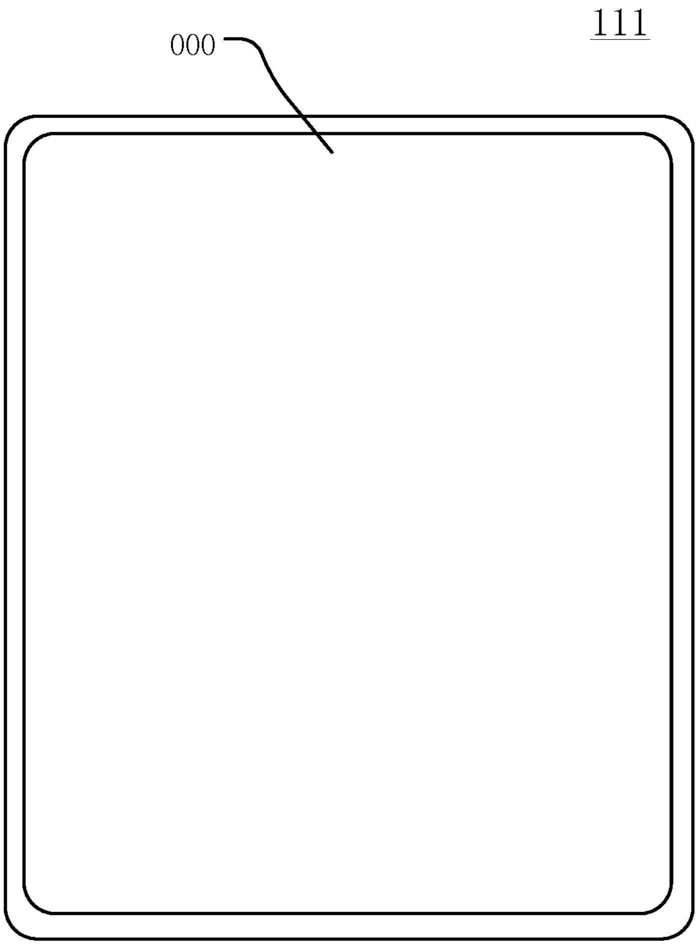
FIG. 14 illustrates a schematic planar structural diagram of a display device consistent with the disclosed embodiments of the present disclosure.

The present disclosure also provides a display device. FIG. 14 illustrates a schematic planar structural diagram of a display device consistent with the disclosed embodiments of the present disclosure. In some embodiments, with reference to FIG. 14, the display device includes a display panel 000 provided by the present disclosure. FIG. 14 only uses a mobile phone as an example to illustrate the display device 111. It may be understood that the display device 111 may be a computer, a television, a vehicle-mounted display device and another display device 111 with a display function. The present disclosure does not specifically limit types of the display devices. The display device 111 provided by the present disclosure may have the beneficial effects of the display panel 000 provided by the present disclosure. For details, reference may be made to specific descriptions of the display panels 000 in the present disclosure.

As disclosed, the technical solutions of the present disclosure have the following advantages.

A sub-pixel of the display panel provided by the present disclosure may include a pixel circuit and a light-emitting element electrically connected to the pixel circuit. The pixel circuit may be used to control the light-emitting element to emit light. The pixel circuit may include a driving transistor, a data input frame, a threshold compensation module, and a bias adjustment module. The data input frame may be used to provide a data signal to the driving transistor. The threshold compensation module may be used to detect and compensate the deviation of the threshold voltage of the driving transistor, and provide the compensated deviation of the threshold voltage and the data signal provided by the data line to the driving transistor to realize the threshold compensation of the driving transistor. The problem of display unevenness, caused by differences in the threshold voltage of the driving transistor due to the manufacturing process, and threshold voltage drift of the driving transistor caused by aging of the transistor, may be alleviated. The bias adjustment module may be used to provide a bias adjustment signal to the driving transistor, adjust the bias state of the driving transistor, alleviate the problem of threshold voltage drift of the driving transistor, and improve the display quality.

The first electrode of the driving transistor may be connected to the first power supply signal, and the second electrode of the driving transistor may be connected to the second power supply signal. When the pixel circuit drives the light-emitting element electrically connected to the pixel circuit to emit light, an electrical conduction path including the first power signal, the driving transistor, the light-emitting element, and the second power signal may be used to make the driving transistor to generate driving current for driving the light-emitting element to emit light. The light-emitting effect of the light-emitting element may thus be realized.

The first power signal connected to the first electrode of the driving transistor in the pixel circuit may be a fixed value, and the second power signal connected to the second electrode of the driving transistor may be a variable value. The voltage value of the second power supply signal may be changed according to the change of the brightness required by the display panel. Accordingly, the overall power consumption of the panel may be reduced.

According to the requirement of the light-emitting brightness of the light-emitting display, by dynamically changing the second power supply signal, the power consumption of the display panel may be reduced. In this case, the bias adjustment signal inputted through the bias adjustment module may also dynamically change following the second power supply signal. Accordingly, the deviation of the light-emitting brightness of the light-emitting element from the originally required brightness due to the change of the second power signal may be avoided, and the display quality of the display panel may thus be improved.

The embodiments disclosed herein are exemplary only and not limiting the scope of the present disclosure. Various combinations, alternations, modifications, equivalents, or improvements to the technical solutions of the disclosed embodiments may be obvious to those skilled in the art. Without departing from the spirit and scope of this disclosure, such combinations, alternations, modifications, equivalents, or improvements to the disclosed embodiments are encompassed within the scope of the present disclosure.

What is claimed is:

1. A display panel, comprising: a plurality of sub-pixels, wherein: each of the plurality of sub-pixels includes a pixel circuit, and a light-emitting element electrically connected to the pixel circuit; the pixel circuit includes a driving transistor, a data input module, a threshold compensation module, and a bias adjustment module; a first electrode of the driving transistor is electrically connected to the data input module and the bias adjusting module respectively, and the driving transistor is configured to generate driving current; a first terminal of the data input module is electrically connected to a data signal, a second terminal of the data input module is electrically connected to the first electrode of the driving transistor, and the data input module is configured to provide the data signal to the driving transistor; a first terminal of the bias adjustment module is electrically connected to a bias adjustment signal, a second terminal of the bias adjustment module is electrically connected to the first electrode of the driving transistor, and the bias adjustment module is configured to provide the bias adjustment signal to the first electrode of the driving transistor to adjust a bias state of the driving transistor; the threshold compensation module is connected between a gate of the driving transistor and a second electrode of the driving transistor, and the threshold compensation module is configured to detect and compensate deviation of a threshold voltage of the driving transistor; the first electrode of the driving transistor is connected to a first power signal, and the second electrode of the driving transistor is connected to a second power signal; the first power signal is a fixed value, the second power signal is a variable value, and the bias adjustment signal is a variable value; a change trend of display brightness of the display panel is inversely proportional to a change trend of the second power signal; and a change trend of the bias adjustment signal is inversely proportional to the change trend of the second power signal.

2. The display panel according to claim 1, wherein:
when a value of the second power signal increases, a value of the bias adjustment signal decreases.

3. The display panel according to claim 2, wherein:
the value of the second power signal increases by ΔA, and the value of the bias adjustment signal decreases by ΔB, with $\Delta B \leq 0.5\ \Delta A$.

4. The display panel according to claim 2, wherein:
a control terminal of the bias adjustment module is electrically connected to a first scanning signal; and
the bias adjustment module is configured to provide the bias adjustment signal to the first electrode of the driving transistor under control of an effective electric level of the first scan signal.

5. The display panel according to claim 4, wherein:
when the value of the second power signal increases, maintenance time of the effective electric level of the first scanning signal decreases.

6. The display panel according to claim 1, wherein: the pixel circuit further includes a first light-emitting control module, a second light-emitting control module, a first reset module, and a second reset module, wherein: a first terminal of the first light-emitting control module is electrically connected to the first power signal, and a second terminal of the first light-emitting control module is electrically connected to the first electrode of the driving transistor; a first terminal of the second light-emitting control module is electrically connected to the first electrode of the driving transistor, and a second terminal of the second light-emitting control module is electrically connected to the light-emitting element; a first terminal of the first reset module is electrically connected to a first reset signal, and a second terminal of the first reset module is electrically connected to the gate of the driving transistor; and a first terminal of the second reset module is electrically connected to a second reset signal, and a second terminal of the second reset module is electrically connected to the light-emitting element.

7. The display panel according to claim 6, wherein: the data input module includes a first transistor, wherein a gate of the first transistor is electrically connected to a second scanning signal, a source of the first transistor is electrically connected to the data signal, and a drain of the first transistor is electrically connected to the first electrode of the driving transistor; the bias adjustment module includes a second transistor, wherein a gate of the second transistor is electrically connected to the first scan signal, a source of the second transistor is electrically connected to the bias adjustment signal, and a drain of the second transistor is electrically connected to the first electrode of the driving transistor; the threshold compensation module includes a third transistor, wherein a gate of the third transistor is electrically connected to a third scan signal, a source of the third transistor is electrically connected to the gate of the driving transistor, and a drain of the third transistor is electrically connected to the second electrode of the driving transistor; the first light-emitting control module includes a fourth transistor, wherein a gate of the fourth transistor is electrically connected to a first light-emitting control signal, a source of the fourth transistor is electrically connected to the first power signal, and a drain of the fourth transistor is electrically connected to the first electrode of the driving transistor; the second light-emitting control module includes a fifth transistor, wherein a gate of the fifth transistor is electrically connected to a second light-emitting control signal, a source of the fifth transistor is electrically connected to the second electrode of the driving transistor, and a drain of the fifth transistor is electrically connected to an anode of the light-emitting element; the first reset module includes a sixth transistor, wherein a gate of the sixth transistor is electrically connected to a fourth scan signal, a source of the sixth transistor is electrically connected to the first reset signal, and a drain of the sixth transistor is electrically connected to the gate of the driving transistor; and the second reset module includes a seventh transistor, wherein a gate of the seventh transistor is electrically connected to the first scan signal, a source of the seventh transistor is electrically connected to the second reset signal, and a drain of the seventh transistor is electrically connected to the anode of the light-emitting element.

8. The display panel according to claim 7, wherein:
each of the third transistor and the sixth transistor is an N-type metal oxide transistor; and each of the first transistor, the second transistor, the fourth transistor, the fifth transistor, the seventh transistor, and the driving transistor is a P-type low-temperature polysilicon transistor.

9. The display panel according to claim 7, wherein:

each of the first transistor, the second transistor, the third transistor, the fourth transistor, the fifth transistor, the sixth transistor, the seventh transistor, and the driving transistor is a P-type low-temperature polysilicon transistor.

10. The display panel according to claim 1, wherein:

the data input module is multiplexed as the bias adjustment module; and the data signal is multiplexed as the bias adjustment signal.

11. The display panel according to claim 1, wherein:

the bias adjustment signal is a DC positive voltage signal.

12. A driving method, applied to the display panel according to claim 1, comprising:

a first bias adjustment stage, a threshold compensation and data input stage, a light-emitting stage, and a power adjustment stage, wherein:

the first bias adjustment stage is performed before the threshold compensation and data input stage;

in the first bias adjustment stage, the bias adjustment module is turned on, and the bias adjustment signal is provided to the first electrode of the driving transistor to adjust the bias state of the driving transistor;

in the threshold compensation and data input stage, the threshold compensation module detects and compensates deviation of the threshold voltage of the driving transistor, and the data input module inputs compensated threshold voltage bias together with the data signal into the driving transistor;

in the light-emitting stage, the driving transistor generates driving current to drive the light-emitting element to emit light; and in the power adjustment stage, a value of the second power signal is adjusted according to a change of the display brightness of the display panel, and a value of the bias adjustment signal is adjusted according to the change of the value of the second power signal.

13. The driving method according to claim 12, wherein:

a change trend of the display brightness of the display panel is inversely proportional to a change trend of the second power signal; and a change trend of the bias adjustment signal is inversely proportional to the change trend of the second power signal.

14. The driving method according to claim 12, wherein:

in the power adjustment stage, the display brightness of the display panel decreases, the value of the second power signal increases, and the value of the bias adjustment signal decreases.

15. The driving method according to claim 12, wherein:

operation time of the power adjustment stage and operation time of the first bias adjustment stage at least partially overlap.

16. The driving method according to claim 12, wherein:

operation time of the power adjustment stage and operation time of the light-emitting stage at least partially overlap.

17. The driving method according to claim 12, further comprising a reset stage, wherein:

the reset stage is performed between the first bias adjustment stage and the threshold compensation and data input stage.

18. The driving method according to claim 17, further comprising a second bias adjustment stage and a third bias adjustment stage, wherein:

the second bias adjustment stage is performed between the reset stage and the threshold compensation and data input stage; and the third bias adjustment stage is performed between the threshold compensation and data input stage and the light-emitting stage.

19. The driving method according to claim 18, wherein:

in the second bias adjustment stage, the value of the bias adjustment signal is changed, and voltage values of the gate of the driving transistor, the first electrode of the driving transistor, and the second electrode of the driving transistor are equal.

20. A display device, comprising a display panel, wherein the display panel comprises: a plurality of sub-pixels, wherein: each of the plurality of sub-pixels includes a pixel circuit, and a light-emitting element electrically connected to the pixel circuit; the pixel circuit includes a driving transistor, a data input module, a threshold compensation module, and a bias adjustment module; a first electrode of the driving transistor is electrically connected to the data input module and the bias adjusting module respectively, and the driving transistor is configured to generate driving current; a first terminal of the data input module is electrically connected to a data signal, a second terminal of the data input module is electrically connected to the first electrode of the driving transistor, and the data input module is configured to provide the data signal to the driving transistor; a first terminal of the bias adjustment module is electrically connected to a bias adjustment signal, a second terminal of the bias adjustment module is electrically connected to the first electrode of the driving transistor, and the bias adjustment module is configured to provide the bias adjustment signal to the first electrode of the driving transistor to adjust a bias state of the driving transistor; the threshold compensation module is connected between a gate of the driving transistor and a second electrode of the driving transistor, and the threshold compensation module is configured to detect and compensate deviation of a threshold voltage of the driving transistor; the first electrode of the driving transistor is connected to a first power signal, and the second electrode of the driving transistor is connected to a second power signal; the first power signal is a fixed value, the second power signal is a variable value, and the bias adjustment signal is a variable value; a change trend of display brightness of the display panel is inversely proportional to a change trend of the second power signal; and a change trend of the bias adjustment signal is inversely proportional to the change trend of the second power signal.

* * * * *